United States Patent
Adamov et al.

(10) Patent No.: US 10,433,025 B2
(45) Date of Patent: Oct. 1, 2019

(54) VIRTUAL REALITY RESOURCE SCHEDULING OF PROCESS IN A CLOUD-BASED VIRTUAL REALITY PROCESSING SYSTEM

(71) Applicant: JAUNT INC., San Mateo, CA (US)

(72) Inventors: Anatoly D. Adamov, Palo Alto, CA (US); Arthur Van Hoff, Menlo Park, CA (US); Christopher P. Redmann, San Mateo, CA (US); Aleksandr O. Ryzhov, Los Gatos, CA (US)

(*) Notice: Subject to any disclaimer, the term of this patent is extended or adjusted under 35 U.S.C. 154(b) by 0 days.

(21) Appl. No.: 15/592,185

(22) Filed: May 10, 2017

(65) Prior Publication Data

US 2017/0330365 A1 Nov. 16, 2017

Related U.S. Application Data

(60) Provisional application No. 62/334,223, filed on May 10, 2016, provisional application No. 62/334,238, (Continued)

(51) Int. Cl.

| | |
|---|---|
| *G06F 15/16* | (2006.01) |
| *H04N 21/6587* | (2011.01) |
| *H04N 21/00* | (2011.01) |
| *H04N 21/239* | (2011.01) |
| *H04N 21/472* | (2011.01) |

(Continued)

(52) U.S. Cl.
CPC ......... *H04N 21/6587* (2013.01); *A63F 13/30* (2014.09); *G06F 3/011* (2013.01); *H04L 67/10* (2013.01); *H04L 67/38* (2013.01); *H04N 21/00* (2013.01); *H04N 21/2393* (2013.01); *H04N 21/47202* (2013.01); *H04N 5/23238* (2013.01)

(58) Field of Classification Search
CPC ......... H04N 21/6587; H04N 21/47202; H04N 21/2393; H04N 21/00; H04N 5/23238; G06F 3/011; A63F 13/30; H04L 67/10; H04L 67/38
USPC ...................................................... 345/504
See application file for complete search history.

(56) References Cited

U.S. PATENT DOCUMENTS

| | | | |
|---|---|---|---|
| 6,912,580 B1* | 6/2005 | Kanevsky | ............... H04L 67/34 455/442 |
| 8,497,865 B2* | 7/2013 | Bakalash | .............. G06T 15/005 345/501 |

(Continued)

*Primary Examiner* — Ke Xiao
*Assistant Examiner* — Kim Thanh T Tran
(74) *Attorney, Agent, or Firm* — Burbage Law, P.C.; Jon-Michael Burbage; Elizabeth Ruzich

(57) ABSTRACT

Systems and methods are disclosed to receive a request for a virtual reality render project that includes information specifying virtual reality video data to be used to create a virtual reality render; determine a plurality of virtual reality jobs required to create the virtual reality render from the virtual reality video data; determine the availability of a plurality of virtual reality nodes across the network; create a virtual reality render map that specifies a processing sequence of the plurality of virtual reality jobs across the one or more virtual reality nodes to create the virtual reality render, the virtual reality render map being created based on at least the availability of the plurality of virtual reality nodes; and process the plurality of virtual reality jobs at the plurality of virtual reality nodes to create the virtual reality.

20 Claims, 11 Drawing Sheets

Related U.S. Application Data filed on May 10, 2016, provisional application No. 62/334,271, filed on May 10, 2016.

(51) Int. Cl.
*H04L 29/06* (2006.01)
*H04L 29/08* (2006.01)
*A63F 13/30* (2014.01)
*G06F 3/01* (2006.01)
*H04N 5/232* (2006.01)

(56) References Cited

U.S. PATENT DOCUMENTS

| | | | |
|---|---|---|---|
| 2006/0106931 A1* | 5/2006 | Richoux | G06F 9/4881 709/226 |
| 2009/0315979 A1* | 12/2009 | Jung | H04N 13/178 348/43 |
| 2013/0311986 A1* | 11/2013 | Arrouye | G06F 8/61 717/175 |
| 2014/0244804 A1* | 8/2014 | Ying | H04L 65/4069 709/219 |
| 2015/0202529 A1* | 7/2015 | Paradise | A63F 13/12 463/31 |
| 2016/0019063 A1* | 1/2016 | Rappoport | G06F 9/3851 712/212 |

* cited by examiner

VIRTUAL REALITY RESOURCE SCHEDULING OF PROCESS IN A CLOUD-BASED VIRTUAL REALITY PROCESSING SYSTEM

CROSS-REFERENCE TO RELATED APPLICATIONS

This application claims the benefit of U.S. Provisional Patent Application Nos. 62/334,223, 62/334,238 and 62/334,271, which were filed May 10, 2016, and are incorporated herein by reference.

FIELD

This disclosure relates generally to resource scheduling in a cloud-based virtual reality processing system.

BACKGROUND

Some virtual reality display devices are released to the market. These display devices may combine a screen, gyroscopic sensors, and accelerometers to create a virtual reality viewing system with a wide field of view and responsive head-tracking.

In a virtual reality system, two or more cameras positioned in different locations may capture images of a common scene. The images may be stitched together to form an aggregate image for the common scene.

The subject matter claimed herein is not limited to embodiments that solve any disadvantages or that operate only in environments such as those described above. Rather, this background is only provided to illustrate one example technology area where some embodiments described herein may be practiced.

SUMMARY

Systems and methods are disclosed to receive a request for a virtual reality render project that includes information specifying virtual reality video data to be used to create a virtual reality render; determine a plurality of virtual reality jobs required to create the virtual reality render from the virtual reality video data; determine the availability of a plurality of virtual reality nodes across the network; create a virtual reality render map that specifies a processing sequence of the plurality of virtual reality jobs across the one or more virtual reality nodes to create the virtual reality render, the virtual reality render map being created based on at least the availability of the plurality of virtual reality nodes; and process the plurality of virtual reality jobs at the plurality of virtual reality nodes to create the virtual reality.

In some embodiments, systems and methods are disclosed where at least some of the plurality of the virtual reality jobs are processed in parallel at the same time. In some embodiments, the plurality of virtual reality nodes are distributed across the Internet. In some embodiments, the plurality of virtual reality nodes include a plurality of cloud-based storage locations where portions of the virtual reality video data are stored and/or a plurality of graphics processing units.

In some embodiments, the request includes information specifying a virtual reality segment, a storage location of a virtual reality segment, a storage location of raw virtual reality video data, a virtual reality camera used to record raw virtual reality video data, the geometry of the virtual reality camera used to record the raw virtual reality video data, the format of the virtual reality render; the geometry of the virtual reality render, a time frame of the raw virtual reality video data, a project identifier, and a priority of the virtual reality render.

In some embodiments, systems and methods are disclosed where the request includes metadata that includes the information specifying one or more characteristics of the virtual reality render.

In some embodiments, the method may include further comprising determining a priority of the virtual reality render project in relationship to one or more other virtual reality render projects, and wherein the creating the virtual reality render map is based on the priority of the virtual reality render project.

In some embodiments, systems and methods are disclosed to determine a cost associated with one or more of the plurality of virtual reality nodes, and wherein the creating the virtual reality render map is based on the cost. In some embodiments, the virtual reality map specifies which of the plurality of virtual reality nodes that will execute each of the plurality of virtual reality jobs.

Some embodiments may include a cloud-based virtual reality content processing system that includes a network; a plurality of virtual reality processing servers communicatively coupled with network; and a virtual reality processing schedule server communicatively coupled with network. In some embodiments, the virtual reality processing schedule server is configured to: receive a request for a virtual reality render project to be created from a virtual reality video data; determine a plurality of virtual reality processing jobs required to create the virtual reality render from the virtual reality video data; determine the availability of the plurality of the virtual reality processing servers; create a virtual reality render map that specifies a processing sequence of the plurality of virtual reality processing jobs across the e plurality of the virtual reality processing servers to create the virtual reality render, the virtual reality render map being created based on at least the availability of the plurality of virtual reality nodes; and instruct the plurality of the virtual reality processing servers to execute the virtual reality render map at the plurality of the virtual reality processing servers.

In some embodiments, the virtual reality processing schedule server is further configured to store the virtue reality render after it is created by the plurality of the virtual reality processing servers. In some embodiments, the plurality of virtual reality processing servers are distributed across the Internet. In some embodiments, the virtual reality processing schedule server is further configured to determine a priority of the virtual reality render project in relationship to one or more other virtual reality render projects, and wherein the creating the virtual reality render map is based on the priority of the virtual reality render project. In some embodiments, the virtual reality processing schedule server is further configured to determine a cost associated with one or more of the plurality of virtual reality nodes, and wherein the creating the virtual reality render map is based on the cost.

In some embodiments, the cloud-based virtual reality content processing system may also include a plurality of cloud-based storage locations where portions of the virtual reality video data are stored.

In some embodiments, the request includes information specifying a virtual reality segment, a storage location of a virtual reality segment, a storage location of raw virtual reality video data, a virtual reality camera used to record raw virtual reality video data, the geometry of the virtual reality camera used to record the raw virtual reality video data, the format of the virtual reality render; the geometry of the virtual reality render, a time frame of the raw virtual reality video data, a project identifier, and a priority of the virtual reality render.

In some embodiments, the request includes metadata that includes the information specifying one or more characteristics of the virtual reality render.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed for processing virtual reality videos tin a cloud-based virtual reality system. For example, raw virtual reality video data may be imported, processed, stitched, rendered, etc. in a cloud based processing system to create a plurality of virtual reality content that can be delivered to users via a virtual reality content delivery network. As another example, scheduling and managing virtual reality processing nodes in a cloud-based processing system to render virtual reality videos is also disclosed.

Figure 1:
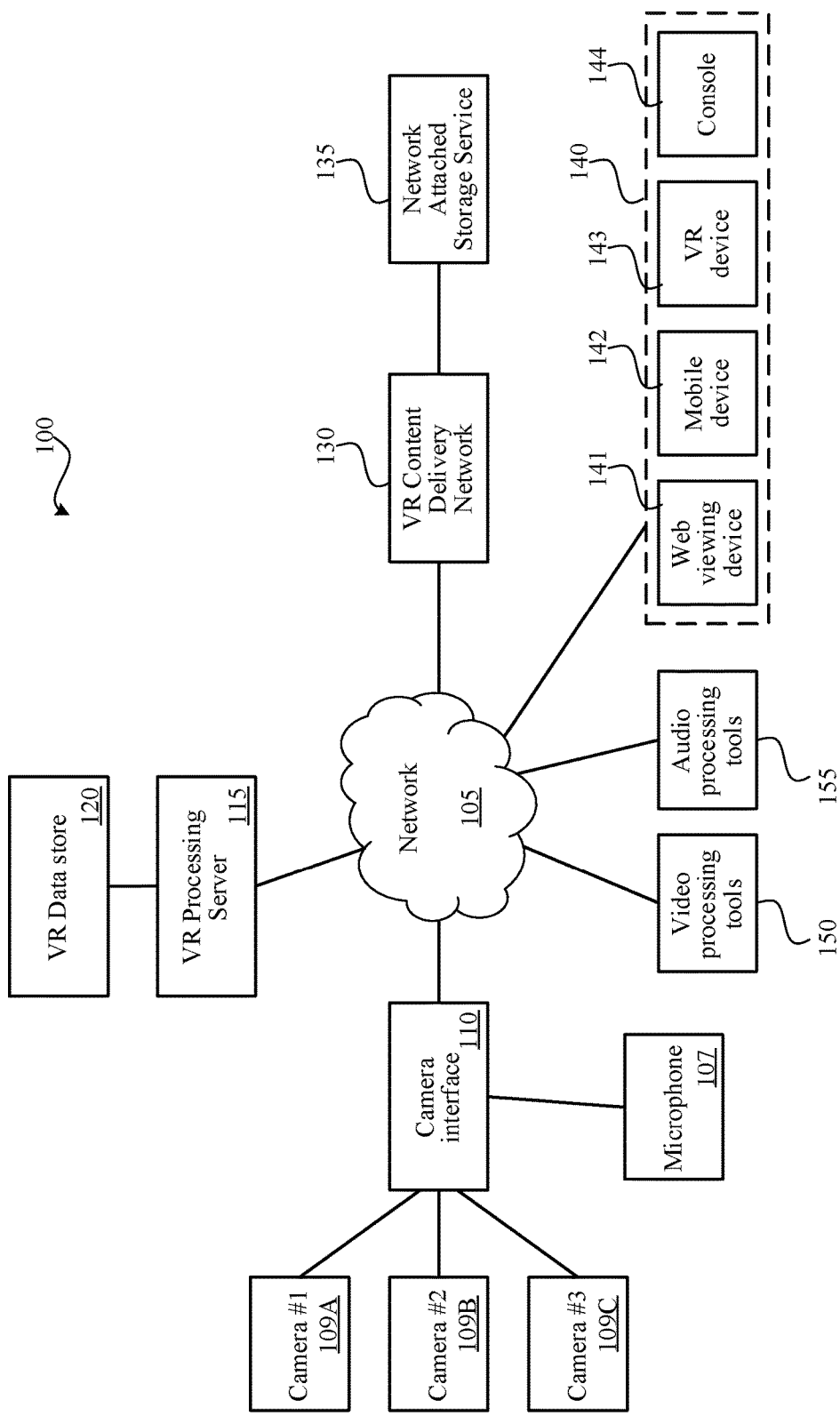
FIG. 1 is a block diagram of a cloud-based virtual reality content processing system according to some embodiments.

FIG. 1 is a block diagram of a cloud-based virtual reality content processing system 100 according to some embodiments. The cloud-based virtual reality content processing system 100 may include a camera interface 110 that may be used to input or upload video recordings from one or more virtual reality camera systems 109A, 109B, and 109C (collectively or individually virtual reality camera system 109). The virtual reality cameras 109 may include any type of virtual reality camera with any number of cameras and/or microphones. The cameras on the virtual reality camera system 109, for example, may be oriented or designed in any manner.

For example, the first virtual reality camera system 109A may comprise a first virtual reality camera make, the second virtual reality camera system 109B may comprise a first model of second, different virtual reality camera make, and the first virtual reality camera system 109A may comprise a third, different model of the second virtual reality camera make.

Any number of virtual reality cameras 109 and/or any number of camera interfaces 110 may be used. In some embodiments, the virtual reality cameras may be owned and/or operated by third party users and may be connected and/or disconnected from a camera interface 110.

For example, the first virtual reality camera system 109A may include twenty-four cameras and a stereo audio microphone. Each of these twenty-four cameras may record video and/or audio data onto an individual storage device (e.g., a secure digital (SD) memory card). Each of these twenty-four cameras may record video in high definition (HD) video data, 2 K video data, 4 K video data, or 5K video data. The first virtual reality camera system 109A may include the Jaunt One camera.

The second virtual reality camera system 109B, for example, may include a plurality of 4 K (or 2 k) cameras, a plurality of professional-grade (e.g., 'silicone ear') microphones, flexible control systems, and/or a novel 3-axis design. The second virtual reality camera system 109B, for example, may include a 24, 30, 36, or 42 of 4 K Blackmagic cameras. The second virtual reality camera system 109B, for example, may include the EYE® professional-grade VR camera system by 360 Designs.

The third virtual reality camera system 109C, for example, may include a virtual reality camera with eight, twelve, sixteen, twenty, etc. synchronized 2 K×2 K video sensors and 360 surround sound audio array. The third virtual reality camera system 109C, for example, may include the Nokio OZO virtual reality camera from Nokia.

As another example, one or more virtual reality cameras 109 may include a GoPro™ camera rig (e.g., a 14 camera rig or a 16 camera rig). A As another example, one or more virtual reality cameras 109 may include an OZO™ camera made by Nokia Technologies of Keilaniemi, Espoo. As another example, one or more virtual reality cameras 109 may include a JAUNT ONE™ camera made by Jaunt of Palo Alto, Calif., or any combination thereof.

In some embodiments, virtual reality camera system 109 may also include various sensors including, but not limited to, a depth sensor, a motion sensor (e.g., a global positioning system (GPS), an accelerometer, a gyroscope, etc.), a sensor for sensing a position of virtual reality camera system 109, and other types of sensors.

Virtual reality camera system 109 may be constructed using various configurations. For example, a plurality of cameras in virtual reality camera system 109 may be configured in different geometries (e.g., a sphere, a line, a cylinder, a cone, and a cubic, etc.) with the corresponding lenses in the plurality of cameras facing toward different directions. Virtual reality camera system 109 may comprise flexible structure so that a particular camera module of the virtual reality camera system 109 may be removed from virtual reality camera system 109 and new cameras of the virtual reality camera system 109 may be added to virtual reality camera system 109.

In some embodiments, the plurality of cameras in virtual reality camera system 109 may be oriented around a sphere in different directions with sufficient diameter and field of view to capture sufficient view disparity to render stereoscopic images. For example, virtual reality camera system 109 may include 32 Point Grey Blackfly Gigabit Ethernet cameras distributed around a 20-centimeter diameter sphere. Camera models that are different from the Point Grey Blackfly camera model may be included in virtual reality camera system 109.

In some embodiments, virtual reality camera system 109 may include a sphere whose exterior surface is covered in one or more optical sensors configured to render 3D images or video. The optical sensors may be communicatively coupled to a controller. The entire exterior surface of the sphere may be covered in optical sensors configured to render 3D images or video.

According to some embodiments, the plurality of cameras in virtual reality camera system 109 may be configured to have a sufficient field-of-view overlap so that all objects can be seen from more than one view point. For example, the horizontal field of view for each camera included in virtual reality camera system 109 is 70 degrees. In some embodiments, having virtual reality camera system 109 configured in such a way that an object may be viewed by more than one cameras may be beneficial for correcting exposure or color deficiencies in the images captured by virtual reality camera system 109.

The plurality of cameras in virtual reality camera system 109 may or may not include built-in batteries. The plurality of cameras may obtain power from a battery or other power supply coupled to camera interface. In some embodiments, the external cases of the plurality of cameras may be made of heat-transferring materials such as metal so that the heat in the plurality of cameras may be dissipated more quickly than using other materials. In some embodiments, each of the plurality of cameras may include a heat dissipation element. Examples of heat dissipation elements include, but are not limited to, heat sinks, fans, and heat-dissipating putty.

The plurality of cameras collectively or individually may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

In some embodiments, the plurality of cameras in virtual reality camera system 109 may form a daisy chain in which the plurality of cameras are connected in sequence. The plurality of cameras in virtual reality camera system 109 may be synchronized through the daisy chain. One camera module, for example, in the daisy chain may be configured as a master camera module that controls clock signals for other cameras of the plurality of cameras. The clock signals may be used to synchronize operations (e.g., start operations, stop operations) of cameras of the virtual reality camera system 109 in virtual reality camera system 109. Through the synchronized start and stop operations of cameras of the virtual reality camera system 109, the image frames in the respective video data captured by the plurality of cameras may also synchronized.

Example embodiments of a virtual reality camera system 109 and/or the plurality of cameras of the virtual reality camera system 109 are described in U.S. application Ser. No. 14/444,938, titled "Camera Array Including Cameras", filed Jul. 28, 2014, which is herein incorporated in its entirety by reference.

The virtual reality camera system 109 may be coupled to camera interface 110. For example, a first camera module of the virtual reality camera system 109 is communicatively coupled to camera interface 110 via any type of communication channel such as, for example, Ethernet cables, high-definition multimedia interface (HDMI) cables, universal serial bus (USB) cables, RCA cables, Firewire, CameraLink, or any other signal line suitable for transmitting video data and audio data. Alternatively, a signal line in the disclosure may represent a wireless connection such as a wireless fidelity (Wi-Fi) connection or a BLUETOOTH® connection. In other embodiments, a signal line may comprise a combination of a wired connection and a wireless connection.

Microphone array 107 may also be coupled with camera interface 110 and/or may include one or more microphones configured to capture sounds from different directions in an environment. It is noted that microphone array 107 may include different microphone systems (e.g., different makes and/or models of microphones). In some embodiments, microphone array 107 may include one or more processors and one or more memories. Microphone array 107 may include a heat dissipation element. In the illustrated embodiment, microphone array 107 is coupled to camera interface 110 via a signal line 104.

Microphone array 107 may be configured to capture sound from various directions. The sound may be stored as raw audio data on a non-transitory memory communicatively coupled to microphone array 107, which may detect directionality of the sound. The directionality of the sound may be encoded and stored as part of the raw audio data.

In some embodiments, microphone array 107 may include a Core Sound Tetramic soundfield tetrahedral microphone array following the principles of ambisonics, enabling reconstruction of sound from any arbitrary direction. For example, microphone array 107 may include an ambisonics microphone mounted on top of the virtual reality camera system 109 and used to record sound and sonic directionality. In some embodiments, microphone array 107 includes a Joseph Grado HMP-1 recording system, or any other microphone system configured according to the same or similar acoustical principles.

In some embodiments, one or more of the plurality of cameras of a virtual reality camera system 109 may be mounted around a camera housing (e.g., a spherical housing or a housing with another suitable shape). Microphone array 107 may include multiple microphones mounted around the same camera housing, with each microphone located in a different position. The camera housing may act as a proxy for the head-shadow sound-blocking properties of a human head.

Camera interface 110 may receive the raw audio data recorded by microphone array 107 and forward the raw audio data to the virtual reality processing server 115 for processing and storage at virtual reality data store 120. The camera interface 110 may also receive and aggregate raw video data describing image frames captured by the virtual reality camera system 109. The camera interface 110 may transfer the raw video data to the virtual reality processing server 115 for processing and storage at virtual reality data store 120 via the network 105. The camera interface 110 is communicatively coupled with the virtual reality processing server 115 via the network 105. In some examples, the camera interface 110 may include a USB hub. In some embodiments, the camera interface 110 may include one or more power supplies that may supply power to the virtual reality camera system 109. Alternatively or additionally, one or more power supplies may be coupled to camera interface 110 for providing power to virtual reality cameras 109.

While three cameras are described above any type of virtual reality camera may be used without limitation.

The camera interface 110 can be used to input recordings from one or more virtual reality cameras 109. The camera interface 110, for example, may include a client side device that can be connected with a virtual reality camera system 109 and/or a storage device having one or more recordings. The client side device may have one or more interfaces within which a camera or a storage device can be connected and used to input recordings from the camera or a storage device. The camera interface 110 also be connect with the network 105 and upload the recordings from the camera or the storage device to the virtual reality processing server 115 and/or to the virtual reality data store 120. The camera interface 110, for example, may be a computer or laptop or may be connected with a computer or a laptop. The camera or a storage device may be connected to the camera interface 110 via USB, FireWire, HDMI, etc. Alternatively or additionally, the client device may include a storage device port such as, for example, an SD port, SD slot.

The camera interface 110, for example, may also include a server side interface The camera interface 110 may receive recordings from one or more virtual reality cameras 109 regardless of the camera type. The server side interface, for example, may be hosted on a webserver and/or as part of the virtual reality processing server 115. The server side interface, for example, may provide a number of data entry fields or widgets to collect information such as, for example, the number of virtual reality cameras, the data compression used to save the virtual reality content, the brand of the virtual reality camera, the serial number of the virtual reality, the model of the virtual reality camera, the type of audio being uploaded, the angular position of the virtual reality cameras, etc.

In some embodiments, the recordings received from the virtual reality cameras 109 may be uploaded to the virtual reality processing server 115 and/or stored in the virtual reality data store 120.

The virtual reality processing server 115 may receive raw video data and raw audio data from camera interface 110 via network 105. In some embodiments, the virtual reality processing server 115 may store the raw video data and raw audio data at virtual reality data store 120. In some embodiments, the virtual reality processing server 115 may aggregate raw video data captured by the virtual reality cameras 109 to form virtual reality content and/or aggregate raw audio data captured by microphone array 107 to form 3D audio data.

In some embodiments, the virtual reality processing server 115 may be operable on a single server. In some embodiments, the virtual reality processing server 115 may be operable on a plurality of servers. In some embodiments, the virtual reality processing server 115 may be operable on a plurality of distributed servers that are located remotely relative to another across the Internet such as, for example, distributed virtual reality processing server 800 shown in FIG. 8.

The virtual reality processing server 115 may include a system configured to aggregate raw video data and raw audio data to generate 3D video data and 3D audio data, respectively. In some other embodiments, the virtual reality processing server 115 may be implemented using a combination of hardware and software. The virtual reality processing server 115, which may reside in the cloud, may be configured for aggregating raw video data captured by two or more cameras including two or more different camera systems. For example, the virtual reality processing server 115 may be configured to receive data from a first virtual reality camera system 109A (e.g., first camera system (e.g., a GoPro™ camera rig) and a second virtual reality camera system 109B (a JAUNT ONE™ camera made by Jaunt of Palo Alto, Calif.), determine parameters for each camera system of the plurality of camera system, and aggregate data from two or more of the plurality of camera systems.

Network 105 may be a conventional type, wired or wireless, and may have numerous different configurations including a star configuration, token ring configuration, or other configurations. Furthermore, network 105 may include a local area network (LAN), a wide area network (WAN) (e.g., the Internet), or other interconnected data paths across which multiple devices may communicate. In some embodiments, network 105 may be a peer-to-peer network. Network 105 may also be coupled to or include portions of a telecommunications network for sending data in a variety of different communication protocols. In some embodiments, network 105 may include BLUETOOTH® communication networks or a cellular communication network for sending and receiving data including via short messaging service (SMS), multimedia messaging service (MMS), hypertext transfer protocol (HTTP), direct data connection, WAP, e-mail, etc.

In some embodiments, the virtual reality processing server 115 may create a virtual reality project from the virtual reality recordings uploaded to the virtual reality data store 120. A virtual reality project may include, for example, virtual reality recordings, segments, and/or renders. In some embodiments, a virtual reality project may define access roles to various portions of the virtual reality recordings, segments, and/or renders that make up a given project. In some embodiments, the virtual reality project access roles may be defined based on the creator of the virtual reality project, the owner of the project, etc.

For example, a given production company may provide access rules for various participants in the production cycle. The director, writer, and/or producer, for example, may be given access to all the recordings, segments, and/or renders. Audio engineers, mixers, computer graphic artists, artists, and/or visual engineers etc. may be given access to specific segments such as, for example, specifically assigned and/or define segments. Marketers, executive producers, and/or investors may be given access to specific renders. The access roles may be defined and/or revised at any time.

A virtual reality project may include, for example, a plurality of recordings of a scene from a virtual reality camera system 109. A recording may include video data from multiple cameras of a virtual reality camera. For example, if a virtual reality camera system 109 recorded video from twenty four cameras, a recording may include video data from each of the twenty four cameras.

A virtual reality project may include, for example, a plurality of segments of the plurality of recordings. Each segment, for example, may be a portion of a virtual reality recording that is divided into portions based on time, view, location, angle, view, and/or camera. For example, if a virtual reality camera system 109 recorded video from twenty four cameras, a segment may include video data from one camera of the virtual reality camera recorded between two distinct time stamps. Alternatively or additionally, for example, a segment may include video data from more than one camera of the virtual reality cameras recorded between two distinct time stamps.

A render can include one or more segments stitched together in such a way to form virtual reality content that may be viewed on a virtual reality headset and/or allow 360 degree viewing of a scene. For example, a render may include video data for a stereoscopic virtual reality headset that allows for 360 views of a scene.

In some embodiments, the virtual reality processing server 115 may create segments based on user input that specify the frames or times that bound the segments.

In some embodiments, the virtual reality processing server 115 may create a render from recordings or segments. The stitching process for making a render, for example, may depend any number of factors such as, for example, the number of cameras on the virtual reality camera, the type of viewing device used to view the virtual reality render, the type of virtual reality render (e.g., conical vs. spherical), stereo vs. mono, etc.

In these and other embodiments, the virtual reality processing server 115 may include a stitching algorithm for stitching images together to form a 3D panorama described by the 3D video data. For example, the virtual reality processing server 115 may stitch the video from multiple cameras into two large-format, panoramic video for left and right eye viewing.

The virtual reality processing server 115 may generate the 3D video data based on the raw video data received from the cameras of the virtual reality camera system 109. For example, the virtual reality processing server 115 may stitch the image frames together based on a frame sync signal in the video and by using audio tracks from a mounted microphone and/or microphones in each camera module of the virtual reality camera system 109 to time-align audio tracks from the microphones. In some embodiments, the stitching is also based on the geometric calibration. The virtual reality processing server 115 may include a stitching algorithm for stitching images captured by the cameras together to form a 3D panorama described by the 3D video data. For example, the virtual reality processing server 115 may stitch the raw video data from multiple cameras into two large-format, panoramic video for left and right eye viewing.

Virtual reality renders may be created in any number of ways by the virtual reality processing server 115. In some embodiments, the virtual reality processing server may identify a location and/or a timing associated with each of the cameras within a virtual reality camera system 109. The virtual reality processing server 115 may synchronize the various video frames within a segment and/or recording based on locations and/or timings associated with the cameras. The virtual reality processing server 115 may construct a left camera map and/or a right camera map. The left camera map, for example, may identify matching cameras for pixels in a left panoramic image. For example, for a pixel in a left panoramic image that represents a point in a panorama, the left camera map identifies a matching camera module that has a better view to the point than other cameras. Similarly, the right camera map may identify matching cameras for pixels in a right panoramic image.

In some embodiments, the virtual reality processing server 115 may generate, based on the left camera map, left panoramic images from the video frames within a segment or recording. For example, the virtual reality processing server 115 may identify matching cameras for pixels in left panoramic images based on the left camera map. The virtual reality processing server 115 may stitch image frames that are captured by the corresponding matching cameras at a particular time to form a corresponding left panoramic image. In some embodiments, the virtual reality processing server 115 may correct color deficiencies in the left panoramic images. In some embodiments, the virtual reality processing server 115 may correct stitching errors in the left panoramic images.

In some embodiments, the virtual reality processing server 115 may generate, based on the right camera map, right panoramic images from the video frames within a segment or recording. For example, the virtual reality processing server 115 may identify matching cameras for pixels in right panoramic images based on the right camera map. The virtual reality processing server 115 may stitch image frames that are captured by the corresponding matching cameras at a particular time to form a corresponding right panoramic image. In some embodiments, the virtual reality processing server 115 may correct color deficiencies in the right panoramic images. In some embodiments, the virtual reality processing server 115 may correct stitching errors in the right panoramic images.

In some embodiments, the virtual reality processing server 115 may compress the left panoramic images and the right panoramic images to generate compressed 3D video data. In some embodiments, the virtual reality processing server 115 may generate audio data (or 3D audio data) from the raw audio data. In some embodiments, the virtual reality processing server 115 may generate content that includes the compressed 3D video data and the 3D audio data In some embodiments, the virtual reality processing server 115 may also compress the 3D audio data to form a compressed 3D audio data, and the VR content may include the compressed 3D video data and the compressed 3D audio data.

In some embodiments, a user may be provided access to a render, recording, and/or segment for various purposes such as, for example, to edit a video or audio. For example, a user may edit a video using various video processing tools 150 and/or edit audio using various audio processing tools 155. Any type of digital video and/or digital audio processing tools may be used. A user may request a specific render, recording, or segment from the virtual reality processing server 115 through the network 105. A copy of the specific render, recording, or segment may be pushed to the video processing tool 150 and/or the audio processing tool 155 from the virtual reality processing server 115 in response to the request. In some embodiments, as part of the request, the user may submit a user identification (e.g., a user name), a password, and/or other credentials allowing the user to access the render, recording, and/or segment. In some embodiments, the user may request the render, recording, and/or segment by file name, by project name, by render name, by segment name, by recording name, by video frame number, by time, by location, by a time period, by a video frame range, etc.

After editing the render, recording, and/or segment the user may submit the edited render, recording, and/or segment to the virtual reality processing server 115. The virtual reality processing server 115 may retrieve or receive the edited render, recording, and/or segment and store the edited render, recording, and/or segment may be stored in virtual reality data store 120 as another version of the render, recording, and/or segment.

In some embodiments, a VR content delivery network 130 may provide virtual reality content having any of various formats to users. For example, a virtual reality format may differ from other virtual reality formats based on geometry, the video container, the playback device, etc. For example, the geometry of a virtual reality format may include a conical, planer, spherical, three-dimensional, panoramic, etc. geometry. As another example, the video container of the virtual reality format may include an MP4, WebM, VP8, etc. container. As yet another example, virtual reality format may be specific to a playback device or model such as, for example, one of the following example playback devices Project StarVR, Oculus Rift, AirVR, Avegant Glyph, Cmoar, Durovis Dive, Dior Eyes VR, Emax X1, Fove, Google Cardboard, Homido, HTC Vive, ImmersiON-VRelia BlueSky, Impression Pi, MindMaze NeuroGoggles, Pinch VR, Razer OSVR, Samsung Gear VR, Sony Project Morpheus, Viewbox, Visus, VR Union Claire, Vrvana Totem, Xingear XG, Zeiss One VR, etc.

FIG. 1 shows VR content delivery network 130 that may provide virtual reality content of various formats to a number of virtual reality devices 140 that may each have specific formatting requirements. The VR content delivery network 130 may provide the virtual reality content to the virtual reality devices through the network 105. The virtual reality devices may include a web viewing device 141, a mobile device 142, a VR device 143, and/or a console 144. Various other virtual reality devices may request and/or receive virtual reality content from the VR content delivery network. The web viewing device 141 may include a computer, a laptop, or a tablet. The mobile device 142 may include a smartphone or a tablet that may include a VR application to play back virtual reality content and/or may require the use of a virtual reality device in conjunction with the smartphone such as, for example, Google Cardboard. The VR Device may include any type of virtual reality headset or virtual reality device such as, for example, Project StarVR, Oculus Rift, AirVR, Avegant Glyph, Cmoar, Durovis Dive, Dior Eyes VR, Emax X1, Fove, Google Cardboard, Homido, HTC Vive, ImmersiON-VRelia BlueSky, Impression Pi, MindMaze NeuroGoggles, Pinch VR, Razer OSVR, Samsung Gear VR, Sony Project Morpheus, Viewbox, Visus, VR Union Claire, Vrvana Totem, Xingear XG, Zeiss One VR, etc. The console 144 may include any type of console that may play virtual reality content such as, for example, a gaming console.

In some embodiments, the VR content delivery network 130 may be coupled with one or more network attached virtual reality storage service 135. The network attached virtual reality storage service 135 may be a separate storage location from the virtual reality data store 120. In some embodiments, the network attached virtual reality storage service 135 may be a cloud based storage location. In some embodiments, the network attached virtual reality storage service 135 may be a distributed and/or remote cloud based storage location such as, for example, distributed virtual reality processing server 800 shown in FIG. 8.

Figure 2:
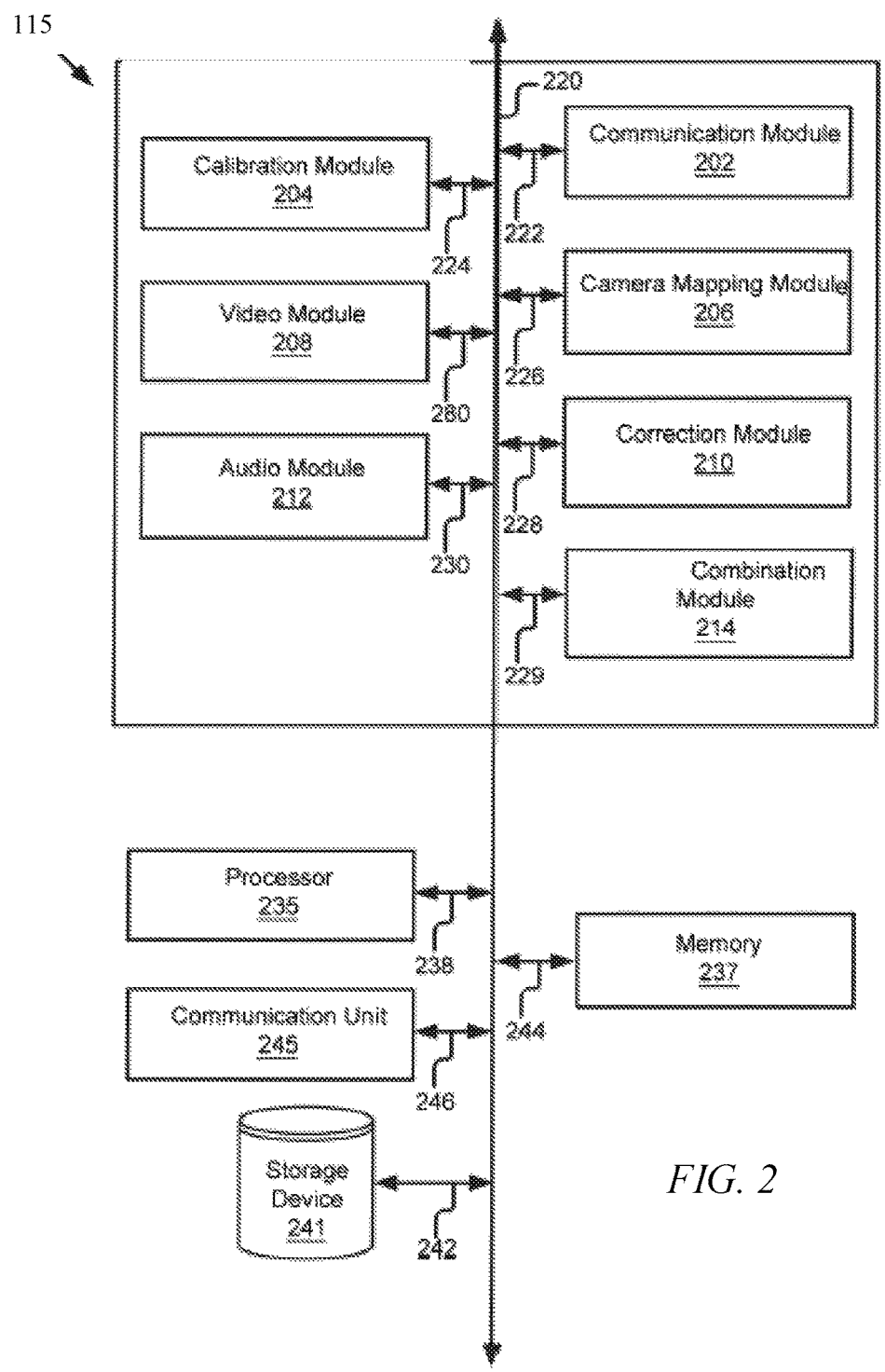
FIG. 2 is a block diagram of an example virtual reality processing server according to some embodiments.

FIG. 2 is a block diagram of an example virtual reality processing server 115. Virtual reality processing server 115 may include a memory 237, a processor 235, a storage device 241, and a communication unit 245. In some embodiments, the components of the virtual reality processing server 115 may be communicatively coupled via a bus 220. Moreover, the virtual reality processing server 115 may be distributed among a plurality of servers where each server includes one or more components shown in FIG. 2 such as, for example, distributed virtual reality processing server 800 shown in FIG. 8.

Processor 235 may include an arithmetic logic unit, a microprocessor, a general-purpose controller, or some other processor array to perform computations and provide electronic display signals to a display device. Processor 235 is coupled to bus 220 for communication with the other components via a signal line 238. Processor 235 may process data signals and may include various computing architectures including a complex instruction set computer (CISC) architecture, a reduced instruction set computer (RISC) architecture, or an architecture implementing a combination of instruction sets. Although FIG. 2 includes a processor 235, multiple processors may be included. Other processors, operating systems, sensors, displays, and physical configurations may be possible.

Memory 237 includes a non-transitory memory that stores data for providing the functionality described herein. Memory 237 may be a dynamic random access memory (DRAM) device, a static random access memory (SRAM) device, flash memory, or some other memory devices. In some embodiments, memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. Memory 237 may store the code, routines, and data for the virtual reality processing server 115 to provide its functionality. Memory 237 is coupled to bus 220 via a signal line 244.

Communication unit 245 may transmit data to any of the entities of cloud-based virtual reality content processing system 100 depicted in FIG. 1. Similarly, communication unit 245 may receive data from any of the entities of cloud-based virtual reality content processing system 100 depicted in FIG. 1. Communication unit 245 may include one or more Ethernet switches for receiving the raw video data and the raw audio data from the camera interface 110. Communication unit 245 is coupled to bus 220 via a signal line 246. In some embodiments, communication unit 245 includes a port for direct physical connection to a network, such as network 105 of FIG. 1, or to another communication channel. For example, communication unit 245 may include a port such as a USB, SD, RJ45, or similar port for wired communication with another computing device. In some embodiments, communication unit 245 includes a wireless transceiver for exchanging data with another computing device or other communication channels using one or more wireless communication methods, including IEEE 802.11, IEEE 802.16, BLUETOOTH®, or another suitable wireless communication method.

In some embodiments, communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, communication unit 245 includes a wired port and a wireless transceiver. Communication unit 245 also provides other conventional connections to a network for distribution of data using standard network protocols including TCP/IP, HTTP, HTTPS, and SMTP, etc.

Storage device 241 may be a non-transitory storage medium that stores data for providing the functionality described herein. Storage device 241 may be a dynamic random access memory (DRAM) device, a static random access memory (SRAM) device, flash memory, or some other memory devices. In some embodiments, storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. Storage device 241 is communicatively coupled to bus 220 via a signal line 242.

In the embodiment illustrated in FIG. 2, the virtual reality processing server 115 may include a communication module 202, a calibration module 204, a camera mapping module 206, a video module 208, a correction module 210, audio module 212, and a combination module 214. These modules of the virtual reality processing server 115 may be communicatively coupled to each other via bus 220.

In some embodiments, each module of the virtual reality processing server 115 (e.g., modules 202, 204, 206, 208, 210, 212, or 214) may include a respective set of instructions executable by processor 235 to provide its respective functionality, as described herein. In some embodiments, each module of the virtual reality processing server 115 may be stored in memory 237 and may be accessible and executable by processor 235. Each module of the virtual reality processing server 115 may be adapted for cooperation and communication with processor 235 and other components of the virtual reality processing server 115.

The communication module 202 may be software including routines for handling communications between the virtual reality processing server 115 and other components of the virtual reality processing server 115. Communication module 202 may be communicatively coupled to bus 220 via a signal line 222. Communication module 202 sends and receives data, via communication unit 245, to and from one or more of the entities of cloud-based virtual reality content processing system 100 depicted in FIG. 1. For example, communication module 202 may receive raw video data from the camera interface 110 via communication unit 245 and may forward the raw video data to video module 208. In another example, communication module 202 may receive VR content from combination module 214 and may send the VR content to a viewing system via communication unit 245.

In some embodiments, communication module 202 receives data from components of the virtual reality processing server 115 and stores the data in memory 237 or storage device 241. For example, communication module 202 receives VR content from combination module 214 and stores the VR content in memory 237 or storage device 241. In some embodiments, communication module 202 retrieves data from memory 237 or storage device 241 and sends the data to one or more appropriate components of the virtual reality processing server 115. Alternatively or additionally, communication module 202 may also handle communications between components of the virtual reality processing server 115.

Calibration module 204 may be software including routines for calibrating the virtual reality camera system 109. Calibration module 204 may be adapted for cooperation and communication with processor 235 and other components of the virtual reality processing server 115 via a signal line 224.

According to various embodiments, calibration module of the virtual reality camera system 109 may determine information (e.g., one or more parameters) regarding each camera module within virtual reality camera system 109. For example, calibration module of the virtual reality camera system 109 may access stored parameters for each camera module (e.g., stored locally within the virtual reality processing server 115 (e.g., in memory 237)). Further, if required (e.g., due to a lack of information regarding a specific camera module), parameters of a camera module of the virtual reality camera system 109 may be received prior to, during, or after receiving video data from the specific camera module. As an example, a user may input the parameters (e.g., via an electronic device). In another example, an uploaded video data from a specific camera module may include metadata comprising parameters for the specific camera module. As will be appreciated, one or more parameters for cameras may be used for distortion correction, rendering of VR video data, and/or stitching of VR video data.

In some embodiments, lenses included in cameras of the virtual reality camera system 109 may have some amount of spherical distortion. Images captured with cameras of the virtual reality camera system 109 may have a barrel distortion or a pin-cushion distortion that needs to be corrected during creation of panoramic images from the distorted images. The barrel distortion may be referred to as a "fish eye effect." For each camera module of the virtual reality camera system 109, calibration module 204 may calibrate a lens in corresponding camera module of the virtual reality camera system 109 to determine associated distortion caused by the lens. For example, a snapshot of a test pattern that has known geometries placed in a known location (e.g., a checkerboard in a known location) may be captured by camera module of the virtual reality camera system 109. Calibration module 204 may determine properties of a lens included in camera module of the virtual reality camera system 109 from the snapshot of the test pattern. Properties of a lens may include, but are not limited to, distortion parameters, an optical center, and other optical properties associated with the lens.

Calibration module 204 may store data describing the properties of each lens in a configuration file. The configuration file may include data describing properties of all lenses of all the cameras on the virtual reality camera system 109. For example, the configuration file includes data describing distortion parameters, an optical center, and other optical properties for each lens in the virtual reality camera system 109.

Alternatively or additionally, calibration module 204 may perform multi-camera geometric calibration on the virtual reality camera system 109 to determine variations in the physical properties of the virtual reality camera system 109. For example, calibration module 204 may determine slight variations in camera orientation for each lens in the virtual reality camera system 109, where the slight variations in the camera orientation may be caused by human errors occurring during an installation or manufacture process of the virtual reality camera system 109. In another example, calibration module 204 may estimate errors in the predicted roll, pitch, and yaw of a corresponding lens in each camera module of virtual reality camera system 109. Calibration module 204 may determine a position and a rotational offset for the corresponding lens in each camera module of virtual reality camera system 109 and may store the position and the rotational offset for the corresponding lens in the configuration file. As a result, the relative position of each two lenses in the virtual reality camera system 109 may be determined based on the positions and rotational offsets of the two corresponding lenses. For example, spatial transformation between each two lenses may be determined based on the positions and rotational offsets of the two corresponding lenses.

Camera mapping module 206 may comprise software including routines for constructing a left camera map and a right camera map. Camera mapping module 206 may be adapted for cooperation and communication with processor 235 and other components of the virtual reality processing server 115 via a signal line 226.

Figure 6A:
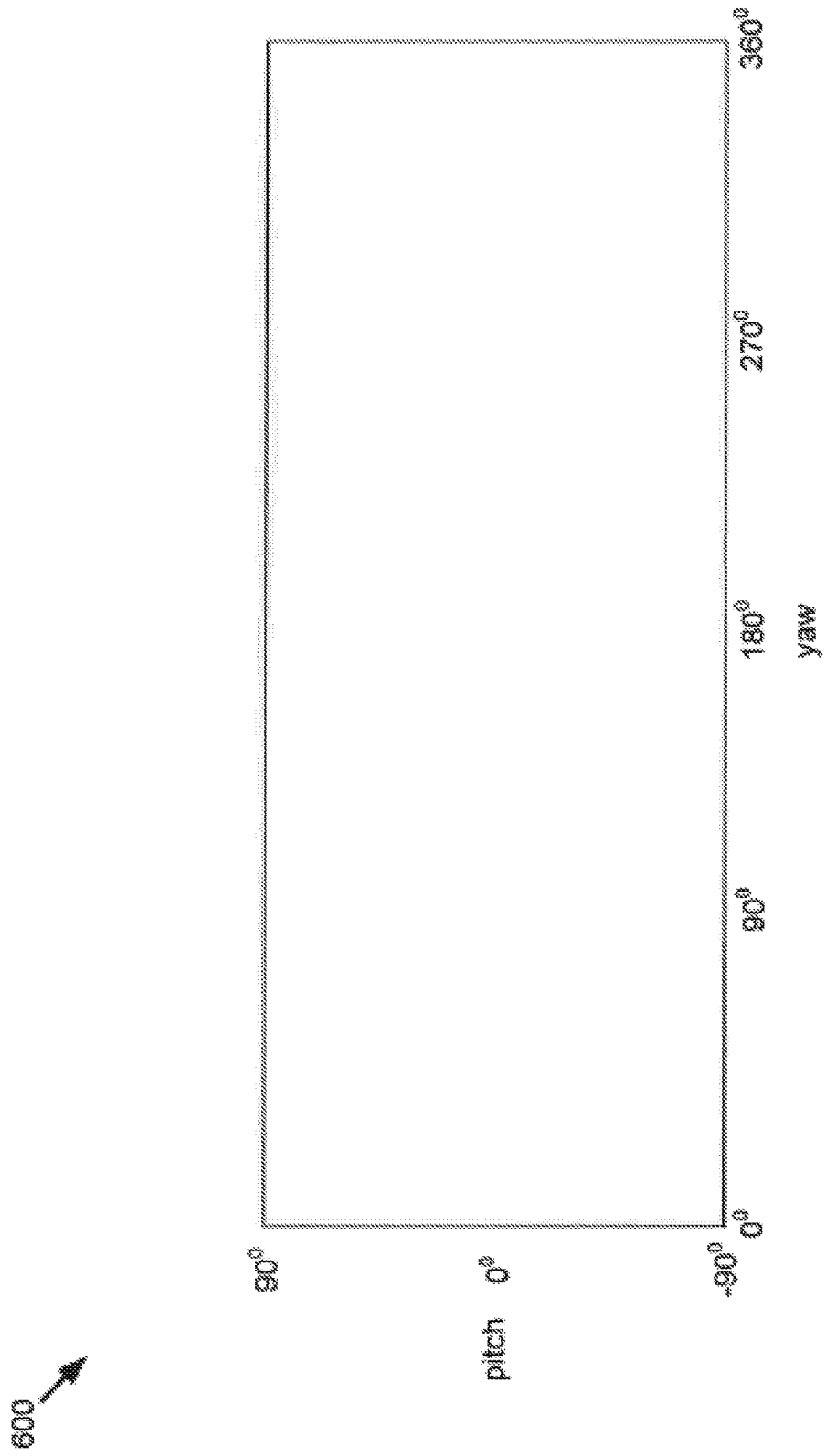
FIG. 6A is a graphic representation that illustrates an example panoramic image.

A two-dimensional (2D) spherical panoramic image may be used to represent a panorama of an entire scene. As described below with reference to video module 208, two stereoscopic panorama images may be generated for two eyes to provide a stereoscopic view of the entire scene. For example, a left panoramic image may be generated for the left eye viewing and a right panoramic image may be generated for the right eye viewing. An example panoramic image is illustrated in FIG. 6A.

A pixel in a panoramic image may be presented by a yaw value and a pitch value. Yaw represents rotation around the center and may be represented on the horizontal x-axis as:

$$yaw = 360° \times x/width. \quad (1)$$

Yaw has a value between 0° and 360°. Pitch represents up or down rotation and may bell represented on the vertical y-axis as:

$$pitch = 90° \times (height/2 - y)/(height/2). \quad (2)$$

Pitch has a value between −90° and 90°.

The panoramic images may give a sense of real depth by exploiting a human brain's capacity to transform disparity (e.g., shifts in pixel positions) into depth. For example, a nearby object may have a larger disparity than a far-away object. Disparity may represent pixel shifts in positions between two images. Disparity may be caused by an interocular distance which represents a distance between two eyes. Each eye may receive a slightly different image, which creates a sense of depth.

Typical stereoscopic systems (e.g., 3D movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at a position with yaw∈[0°, 360°] and pitch=0° in a left panoramic image may represent an eye viewing position of the left eye as the head is rotated to the position indicated by the yaw value and the pitch value. Similarly, a pixel at the position with yaw∈[0°, 360°], and pitch=0° in a right panoramic image represents an eye viewing position of the right eye as the head is rotated to the position indicated by the yaw value and the pitch value. For pitch=0° (e.g., no up and down rotations), as the head is rotated from yaw=0° to yaw=360°, a blended panorama for eye viewing positions with all 360-degree head rotations in the horizontal axis may be produced.

In some embodiments, the blended panorama is effective for head rotations along the horizontal axis (e.g., yaw) but not for the vertical axis (e.g., pitch). As a user tilts his or her head upwards or downwards (e.g., pitch≠0°), the dominant orientation of the user's eyes with respect to points on the sphere may become less well defined compared to pitch=0°. For example, when the user looks directly upward with pitch=90°, the orientation of the user's eyes with respect to the north pole point of the sphere may be completely ambiguous since the user's eyes may view the north pole point of the sphere from any yaw. Stereo vision may not be supported in the upward and downward directions using left/right eye spheres that are supported in the horizontal orientation. As a result, binocularity may be phased out by diminishing the interocular distance with an adjustment function f(pitch). An output of the adjustment function f(pitch) may decline from 1 to 0 as the pitch increases from 0° to 90° or decreases from 0° to −90°. For example, the adjustment function f(pitch) may include cos(pitch). The interocular distance may be adjusted based on the adjustment function f(pitch). For example, the interocular distance associated with the pitch may be adjusted as:

$$\text{interocular distance} = \max(\text{interocular distance}) \times f(\text{pitch}), \quad (3)$$

wherein max(interocular distance) represents the maximum value of the interocular distance (e.g., the interocular distance is at its maximum when pitch=0°.

If f(pitch)=cos(pitch), then the interocular distance may be expressed as:

$$\text{interocular distance} = \max(\text{interocular distance}) \times \cos(\text{pitch}). \quad (4)$$

In some examples, the maximum value of the interocular distance may be about 60 millimeters. In other examples, the maximum value of the interocular distance may have a value greater than 60 millimeters or less than 60 millimeters.

Camera mapping module 206 may construct a left camera map that identifies a corresponding matching camera module for each pixel in a left panoramic image. For example, for a pixel in a left panoramic image that represents a point in a panorama, the left camera map may identify a matching camera module that has a best view for the point in the panorama compared to other cameras of the virtual reality camera system 109. Thus, the left camera map may map pixels in a left panoramic image to matching cameras of the virtual reality camera system 109 that have best views for the corresponding pixels. Determination of a matching camera module of the virtual reality camera system 109 for a pixel is described below in more detail.

Figure 6B:
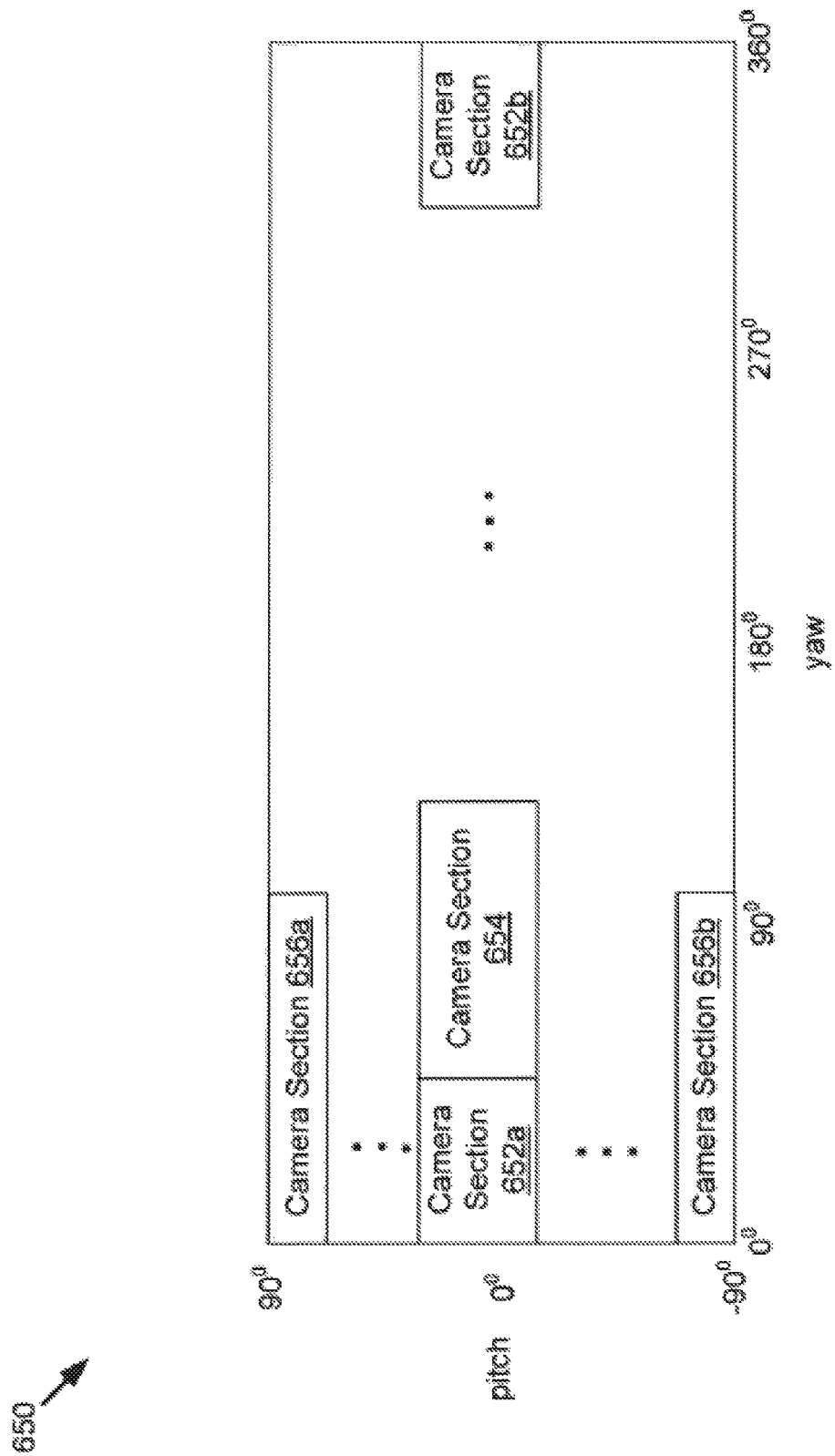
FIG. 6B is a graphic representation that illustrates an example camera map.

An example camera map is illustrated in FIG. 6B. A camera map may include a left camera map or a right camera map. A camera map may use (yaw, pitch) as an input and may generate an output of (an identifier of a matching camera module, x, y), indicating a pixel (yaw, pitch) in a panoramic image may be obtained as a pixel (x, y) in an image plane of the identified matching camera module. The camera map may store the output (an identifier of a matching camera module, x, y) in a map entry related to the input (yaw, pitch). Pixels in an image plane of a camera module may be determined by using a camera model (e.g., a pinhole camera model or more complex lens model) to map points in 3D space onto pixels in the image plane of the camera module, where the points in the 3D space are assumed to be at a particular distance from the camera module. For example, referring to FIG. 7A, a distance for a point 716 may refer to a distance from point 716 to a center of the virtual reality camera system 109. The distance may be set at a fixed radius or varied as a function of pitch and yaw. The distance may be determined by: (1) measuring the scene; (2) manual adjustment by a human operator; (3) using a depth sensor to measure depths of the points in the 3D space; or (4) determining the depths using stereo disparity algorithms.

For each pixel in a left panoramic image that represents a point in a panorama, camera mapping module 206 may determine a yaw, a pitch, and an interocular distance using the above mathematical expressions (1), (2), and (3), respectively. Camera mapping module 206 may use the yaw and pitch to construct a vector representing a viewing direction of the left eye (e.g., a left viewing direction) to the corresponding point in the panorama.

In some embodiments, a matching camera module of the virtual reality camera system 109 for a pixel in a left panoramic image that has a better view of the pixel may have a viewing direction to a point in a panorama that corresponds to the pixel in the left panoramic image. The viewing direction of a matching camera module of the virtual reality camera system 109 is closer to the left viewing direction than other viewing directions of other cameras to the same point in the panorama. For example, referring to FIG. 7A, viewing direction 714 of matching camera module is more parallel to a left viewing direction 704 than other viewing directions of other cameras of the virtual reality camera system 109. In other words, for each pixel in the left panoramic image, the left camera map may identify a corresponding matching camera module of the virtual reality camera system 109 that has a viewing direction most parallel to the left viewing direction than other viewing directions of other cameras of the virtual reality camera system 109. Illustrations of a matching camera module of the virtual reality camera system 109 with a more parallel viewing direction to a left viewing direction are illustrated with reference to FIGS. 7A and 7B.

Similarly, camera mapping module 206 may construct a right camera map that identifies a corresponding matching of the virtual reality camera system 109 for each pixel in a right panoramic image. For example, for a pixel in a right panoramic image that represents a point in a panorama, the right camera map may identify a matching camera module of the virtual reality camera system 109 that has a better view for the point in the panorama than other cameras of the virtual reality camera system 109. Thus, the right camera map may map pixels in a right panoramic image to matching cameras of the virtual reality camera system 109 that have better views for the corresponding pixels.

For each pixel in a right panoramic image that represents a point in a panorama, camera mapping module 206 may determine a yaw, a pitch, and an interocular distance using the above mathematical expressions (1), (2), and (3), respectively. Camera mapping module 206 may use the yaw and pitch to construct a vector representing a viewing direction of the right eye (e.g., a right viewing direction) to the corresponding point in the panorama.

In some embodiments, a matching camera module the virtual reality camera system 109 for a pixel in a right panoramic image that has a better view of the pixel may have a viewing direction to a point in a panorama that corresponds to the pixel in the right panoramic image. The viewing direction of matching camera module the virtual reality camera system 109 is closer to the right viewing direction than other viewing directions of other cameras of the virtual reality camera system 109 to the same point in the panorama. For example, the viewing direction of matching camera module the virtual reality camera system 109 is more parallel to the right viewing direction than other viewing directions of other cameras of the virtual reality camera system 109. In other words, for each pixel in the right panoramic image, the right camera map may identify a corresponding matching camera module the virtual reality camera system 109 that has a viewing direction most parallel to the right viewing direction than other viewing directions of other cameras of the virtual reality camera system 109.

Since the physical configuration of the virtual reality camera system 109 is fixed, the left and right camera maps are the same for different left panoramic images and right panoramic images, respectively. The left and right camera maps may be pre-computed and stored to achieve a faster processing speed compared to an on-the-fly computation.

Video module 208 may comprise software including routines for generating 3D video data configured to render 3D video when played back on a VR display device. Video module 208 may be adapted for cooperation and communication with processor 235 and other components of the virtual reality processing server 115 via a signal line 280. The 3D video data may describe a stereoscopic panorama of a scene that may vary over time. The 3D video data may include left panoramic images for left eye viewing and right panoramic images for right eye viewing.

In some embodiments, video module 208 may receive raw video data describing image frames from various the virtual reality camera system 109. Video module 208 identifies a location and timing associated with each of cameras of the virtual reality camera system 109 and synchronizes the image frames based on locations and timings of cameras of the virtual reality camera system 109. Video module 208 synchronizes corresponding image frames that are captured by different cameras of the virtual reality camera system 109 at the same time.

For example, video module 208 receives a first image frames from a first camera module the virtual reality camera system 109 and a second image frames from a second camera module the virtual reality camera system 109. Video module 208 identifies that first camera module the virtual reality camera system 109 is located at a position with yaw=0° and pitch=0° and second camera module the virtual reality camera system 109 is located at a position with yaw=30° and pitch=0°. Video module 208 synchronizes the first image frames with the second image frames by associating a first image frame from the first video captured at a first particular time $T=T_0$ with a second image frame from the second video captured at the same particular time $T=T_0$, a third image frame from the first video captured at a second particular time $T=T_1$ with a fourth image frame from the second video captured at the same particular time $T=T_1$, and so on and so forth.

In some embodiments, video module 208 may send the synchronized image frames to correction module 210 so that correction module 210 may correct calibration errors in the synchronized image frames. For example, correction module 210 may correct lens distortion, orientation errors, and rotation errors, etc., in the image frames. Correction module 210 may send the image frames back to video module 208 after correcting the calibration errors.

Video module 208 may receive a left camera map and a right camera map from camera mapping module 206. Alternatively, video module 208 may retrieve the left and right camera maps from storage device 241 or memory 237. Video module 208 may construct left panoramic images from the image frames based on the left camera map. For example, video module 208 identifies matching cameras of the virtual reality camera system 109 listed in the left camera map. Video module 208 constructs a first left panoramic image $PI_{L,0}$ by stitching image frames that are captured by matching cameras of the virtual reality camera system 109 at a first particular time $T=T_0$. Video module 208 constructs a second left panoramic image $PI_{L,1}$ by stitching image frames that are captured by matching cameras of the virtual reality camera system 109 at a second particular time $T=T_1$, and so on and so forth. Video module 208 constructs the left panoramic images to include the first left panoramic image $PI_{L,0}$, the second left panoramic image $PI_{L,1}$, and other constructed left panoramic images.

Specifically, for a pixel in a left panoramic image $PI_{L,i}$ at a particular time $T=T_i$ (i=0, 1, 2, ... ), video module 208: (1) identifies a matching camera module of the virtual reality camera system 109 from the left camera map; and (2) configures the pixel in the left panoramic image $PI_{L,i}$ to be a corresponding pixel from an image frame that is captured by matching camera module of the virtual reality camera system 109 at the particular time $T=T_i$. The pixel in the left panoramic image $PI_{L,i}$ and the corresponding pixel in the image frame of matching camera module of the virtual reality camera system 109 may correspond to the same point in the panorama. For example, for a pixel location in the left panoramic image $PI_{L,i}$ that corresponds to a point in the panorama, video module 208: (1) retrieves a pixel that also corresponds to the same point in the panorama from the image frame that is captured by matching camera module of the virtual reality camera system 109 at the particular time $T=T_i$; and (2) places the pixel from the image frame of the matching camera module of the virtual reality camera system 109 into the pixel location of the left panoramic image $PI_{L,i}$.

Similarly, video module 208 may construct right panoramic images from the image frames based on the right camera map by performing operations similar to those described above with reference to the construction of the left panoramic images. For example, video module 208 may identify matching cameras of the virtual reality camera system 109 listed in the right camera map. Video module 208 may construct a first right panoramic image $PI_{R,0}$ by stitching image frames that are captured by matching cameras of the virtual reality camera system 109 at a first particular time $T=T_0$. Video module 208 may construct a second right panoramic image $PI_{R,1}$ by stitching image frames that are captured by the matching cameras of the virtual reality camera system 109 at a second particular time $T=T_1$, and so on and so forth. Video module 208 may construct the right panoramic images to include the first right panoramic image $PI_{R,0}$ the second right panoramic image $PI_{R,1}$, and other constructed right panoramic images.

Specifically, for a pixel in a right panoramic image $PI_{R,i}$ at a particular time $T=T_i$, (i=0, 1, 2, ... ), video module 208: (1) identifies a matching camera module of the virtual reality camera system 109 from the right camera map; and (2) configures the pixel in the right panoramic image $PI_{R,i}$ to be a corresponding pixel from an image frame that is captured by matching camera module of the virtual reality camera system 109 at the particular time $T=T_i$. The pixel in the right panoramic image $PI_{R,i}$ and the corresponding pixel in the image frame of matching camera module of the virtual reality camera system 109 may correspond to the same point in the panorama.

In some embodiments, video module 208 may construct pixels in a left or right panoramic image by blending pixels from image frames of multiple cameras of the virtual reality camera system 109 according to weights associated with multiple cameras of the virtual reality camera system 109.

In some embodiments, the left and right panoramic images may be optimized for stereoscopic viewing in a horizontal plane (e.g., yaw∈[0°, 360°] and pitch=0°). Alternatively or additionally, the left and right panoramic images may be optimized based on a user's viewing direction. For example, video module 208 may adaptively construct the left panoramic images and right panoramic images based on the user's current viewing direction. A panorama provided by the left and right panoramic images may have a high-resolution in the user's current viewing direction and a low-resolution in a reverse viewing direction. This panorama may be referred to as a directional panorama. As the user rotates his or her head to view the panorama in a new viewing direction, the directional panorama may be adjusted to have a high resolution in the new viewing direction and a low resolution in a viewing direction opposite to the new viewing direction. Since only a directional panorama is constructed, bandwidth and other resources may be saved compared to constructing a full high-resolution panorama. However, quality of the 3D viewing experience is not affected if the user does not change viewing directions rapidly.

In some embodiments, a constructed left or right panoramic image may have color deficiencies. For example, since the lenses in cameras of the virtual reality camera system 109 may point to different directions, light and color conditions may vary for the different lenses. Some image frames taken by some cameras of the virtual reality camera system 109 may be over-exposed while some other image frames taken by other cameras of the virtual reality camera system 109 may be under-exposed. The exposure or color deficiencies between image frames from different cameras of the virtual reality camera system 109 may be corrected by correction module 210 during a construction process of the left or right panoramic image.

Additionally or alternatively, due to the disparity between neighboring cameras of the virtual reality camera system 109, a constructed left or right panoramic image may have stitching artifacts (or, stitching errors) where the viewpoint switches from a camera module of the virtual reality camera system 109 to a neighboring camera module of the virtual reality camera system 109. Objects that are far away from cameras of the virtual reality camera system 109 may have negligible disparity and there may be no stitching errors for the far-away objects. However, objects that are near cameras of the virtual reality camera system 109 may have noticeable disparity and there may be stitching errors for the nearby objects. Correction of the stitching errors is described below in more detail with reference to correction module 210.

Correction module 210 may comprise software including routines for correcting aberrations in image frames or panoramic images. Correction module 210 is communicatively coupled to bus 220 via a signal line 228. The aberrations may include calibration errors, exposure or color deficiencies, stitching artifacts, and other types of aberrations. The stitching artifacts may include errors made by video module 208 when stitching image frames from various cameras of the virtual reality camera system 109 to form a left or right panoramic image. Correction module 210 may analyze the image frames or the panoramic images to identify the aberrations. Correction module 210 may process the image frames or panoramic images to mask or correct the aberrations. Correction module 210 may automatically correct the aberrations or provide an administrator of the virtual reality processing server 115 with tools or resources to manually correct the aberrations.

In some embodiments, correction module 210 may receive image frames captured by a camera module of the virtual reality camera system 109 and corrects calibration errors on the image frames. For example, correction module 210 may correct lens distortion (e.g., barrel or pin-cushion distortion) and camera orientation errors in the image frames based on lens distortion parameters, a position, and a rotational offset associated with camera module of the virtual reality camera system 109.

In another example, correction module 210 may analyze the image frames captured by camera module of the virtual reality camera system 109, determine the calibration errors present in the image frames, and determine calibration factors used to calibrate camera module of the virtual reality camera system 109. The calibration factors may include data used to automatically modify the image frames captured by camera module of the virtual reality camera system 109 so that the image frames include fewer errors. In some embodiments, the calibration factors are applied to the image frames by correction module 210 so that the image frames include no errors that are detectable during user consumption of the VR content. For example, correction module 210 may detect the deficiencies in the image frames caused by the calibration errors. Correction module 210 may determine one or more pixels associated with the deficiencies. Correction module 210 may determine the pixel values associated with these pixels and then modify the pixel values using the calibration factors so that the deficiencies are corrected. In some embodiments, the calibration factors may also be provided to an administrator of the virtual reality camera system 109 who uses the calibration factors to manually correct the calibration deficiencies of the virtual reality camera system 109.

In some embodiments, correction module 210 may detect and correct exposure or color deficiencies in the image frames captured by the virtual reality camera system 109. For example, correction module 210 may determine one or more pixels associated with the exposure or color deficiencies. Correction module 210 may determine the pixel values associated with these pixels and then modify the pixel values so that the exposure or color deficiencies are not detectable by a user during consumption of the VR content using a viewing system. In some embodiments, cameras of the virtual reality camera system 109 of the virtual reality camera system 109 may have overlapping fields of view, and exposure or color deficiencies in the image frames captured by the virtual reality camera system 109 may be corrected or auto-corrected using this overlap. In other embodiments, exposure or color deficiencies in the image frames captured by the virtual reality camera system 109 may be corrected using calibration based on color charts of known values.

In some embodiments, correction module 210 may correct stitching errors caused by close-by objects. For example, the closer an object is to the virtual reality camera system 109, the greater the difference of a viewing angle from each camera module of the virtual reality camera system 109 to the object. Close-by objects that cross a stitching boundary may abruptly transition between viewing angles and may thus produce an obvious visual discontinuity. This may be referred to herein as the "close object problem." Stitching artifacts may be incurred for close-by objects. One example mechanism to reduce the stitching errors may include increasing the number of cameras of the virtual reality camera system 109 distributed throughout a spherical housing case of the virtual reality camera system 109 to approach an ideal of a single, continuous, and spherical image sensor. The mechanism may reduce the viewing angle discrepancy between neighboring cameras and may thus reduce the stitching artifacts. Alternatively, virtual cameras may be interpolated between real cameras to simulate an increasing camera density so that stitching artifacts may be reduced. Image stitching using virtual cameras is described in more detail in U.S. application Ser. No. 14/465,581, titled "Image Stitching" and filed Aug. 21, 2014, which is incorporated herein in its entirety by reference.

Audio module 212 may comprise software including routines for generating a 3D audio data configured to render 3D audio when played back on an audio reproduction device. Audio module 212 may be communicatively coupled to bus 220 via a signal line 230. Audio module 212 may generate the 3D audio data based on the raw audio data received from microphone array 107. It is noted that audio module 212 may generate the 3D audio data based on the raw audio data received from different microphones systems (e.g., different makes and/or different microphone models) of one or more microphone arrays 107 In some embodiments, audio module 212 may process the raw audio data to generate four-channel ambisonic audio tracks corresponding to the 3D video data generated by video module 208. The four-channel ambisonic audio tracks may provide a compelling 3D 360-degree audio experience to a user.

In some embodiments, the four-channel audio tracks may be recorded in an "A" format by microphone array 107 such as a Tetramic microphone. Audio module 212 may transform the "A" format four-channel audio tracks to a "B" format that includes four signals: W, X, Y, and Z. The W signal may represent a pressure signal that corresponds to an omnidirectional microphone, and the X, Y, Z signals may correspond to directional sounds in front-back, left-right, and up-down directions, respectively. In some embodiments, the "B" format signals may be played back in a number of modes including, but not limited to, mono, stereo, binaural, surround sound including four or more speakers, and any other modes. In some examples, an audio reproduction device may include a pair of headphones, and the binaural playback mode may be used for the sound playback in the pair of headphones. Audio module 212 may convolve the "B" format channels with Head Related Transfer Functions (HRTFs) to produce binaural audio with a compelling 3D listening experience for a user.

In some embodiments, audio module 212 may generate 3D audio data that is configured to provide sound localization to be consistent with the user's head rotation. For example, if a sound is emanating from the user's right-hand side and the user rotates to face the sound, the audio reproduced during consumption of the VR content sounds as if it is coming from in front of the user.

In some embodiments, the raw audio data is encoded with the directionality data that describes the directionality of the recorded sounds. Audio module 212 may analyze the directionality data to produce 3D audio data that changes the sound reproduced during playback based on the rotation of the user's head orientation. For example, the directionality of the sound may be rotated to match the angle of the user's head position. Assume that the VR content depicts a forest with a canopy of tree limbs overhead. The audio for the VR content includes the sound of a river. The directionality data indicates that the river is behind a user, and so the 3D audio data generated by audio module 212 is configured to reproduce audio during playback that makes the river sound as if it is located behind a user. This is an example of the 3D audio data being configured to reproduce directionality. Upon hearing the audio for the river, a user may sense that the river is behind him or her. The 3D audio data is configured so that as a user tilts his or her head to the side, the sound of the water changes. As the angle of the tilt approaches 180 degrees relative to the starting point, the river sounds as though it is in front of a user. This is an example of the 3D audio data being configured to reproduce directionality based on the angle of a user's head position. The 3D audio data may be configured so that the sound of the river becomes more distinct and clearer, and a user has a better sense of how far the water is from a user and how fast the water is flowing.

Combination module 214 may comprise software including routines for combining 3D video data and 3D audio data to generate VR content. Combination module 214 may be communicatively coupled to bus 220 via a signal line 229. The 3D video data may include a left panoramic images for left eye viewing and right panoramic images for right eye viewing. Redundancy may exist between the left panoramic images and the right panoramic images.

Combination module 214 may compress the left panoramic images and the right panoramic images to generate compressed 3D video data using video compression techniques. In some embodiments, within each of the left or right panoramic images, combination module 214 may use redundant information from one frame to a next frame to reduce the size of the corresponding video. For example, with reference to a first image frame (e.g., a reference frame), redundant information in the next image frames may be removed to reduce the size of the next image frames. This compression may be referred to as temporal or inter-frame compression within the same left or right panoramic images.

Alternatively or additionally, combination module 214 may use one set of images (either the left panoramic images or the right panoramic images) as a reference and may compress the other based on the reference. For example, combination module 214 may use each left panoramic image as a reference frame for a corresponding right panoramic image and may compress the corresponding right panoramic image based on the referenced left panoramic image.

In some embodiments, combination module 214 may encode the 3D video data (or compressed 3D video data) and/or 3D audio data to form a VR content. For example, combination module 214 may compress the 3D video data using H.264 and the 3D audio data using advanced audio coding (AAC). In another example, combination module 214 may compress the 3D video data and the 3D audio data using a standard MPEG format. The VR content may be constructed by combination module 214 using any combination of the 3D video data (or the compressed 3D video data), the 3D audio data (or the compressed 3D audio data), content data from a content server, an advertisement data from ad server, social data from social network server, and/or any other suitable video, audio, or VR content.

In some embodiments, the VR content may be packaged in a container format such as MP4, WebM, VP8, and any other suitable format.

Figure 3:
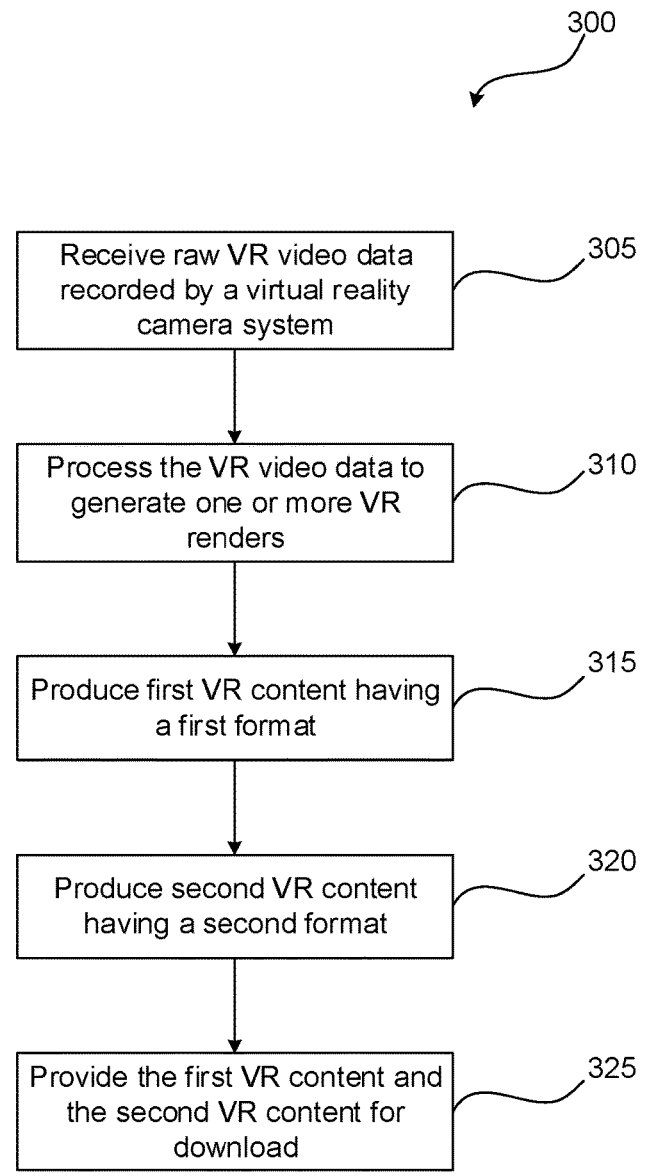
FIG. 3 is a flowchart of an example process for producing virtual reality content using a cloud-based virtual reality processing system.

FIG. 3 is a flowchart of an example process 300 for producing virtual reality content using a cloud-based virtual reality processing system according to some embodiments. One or more steps of the process 300 may be implemented, in some embodiments, by one or more components of the cloud-based virtual reality content processing system 100 of FIG. 1. Although illustrated as discrete blocks, various blocks may be divided into additional blocks, combined into fewer blocks, or eliminated, depending on the desired implementation.

Process 300 begins at block 305. At block 305 raw VR video data recorded by a virtual reality camera system is received. The VR video data, for example, may be received at the virtual reality processing server 115 through the network 105 via camera interface 110. The raw VR video data may be input from a virtual reality camera system 109. In some embodiments, the VR video data may or may not include audio data. In some embodiments, the VR video data may also include data specifying the number of cameras, time stamps coordinating the video data among the cameras, the orientation and/or configuration of the cameras, etc. In some embodiments, the VR video data may include data that specifies the make and/or model of the virtual reality camera system 109 used to capture the raw video data. This data may be used to determine the number of cameras, the orientation and/or configuration of the cameras, etc.

At block 310 one or more VR renders may be produced from the raw video data. A VR render, for example, may include one or more raw video segments stitched together in such a way to form virtual reality content that may be viewed on a virtual reality headset and/or allow 360 degree viewing of a scene. Various techniques described in this document may be used to produce a VR render.

At block 315 a first VR content may be produced from the one or more renders that includes a first VR format. The first VR content may be produced from the one or more renders produced at block 310. In some embodiments, the VR processing server 315 may produce the first VR content.

At block 320 second VR content may be produced from the one or more renders that includes a second VR format that is different than the first VR format. The second VR content may be produced from the one or more renders produced at block 310. In some embodiments, the VR processing server 315 may produce the second VR content. The first VR content and the second VR content may include the same number, combination, order, organization, etc. of virtual reality renders. The first VR content and the second VR content may provide views of the same portions of the scene recorded in the raw virtual reality video data.

In some embodiments, a user may input data that indicates the segments of the VR renders that should be used to create the first VR content and the second VR content. In some embodiments, the first VR content and the second VR content are produced from the same segments of the same renders and only differ based on the format of the VR content.

In some embodiments, a user may edit one or more portions of the raw VR video data and/or the VR renders. The editing, for example, may occur using any type of video or audio editing tools.

In some embodiments, the first VR content and the second VR content may include audio data.

The first virtual reality format may differ from the second virtual reality format based on the geometry, the video container, the type of playback device, etc. For example, the geometry of a first virtual reality format or the second virtual reality format may include a conical, planer, spherical, cubic, three-dimensional, panoramic, etc. geometry. As another example, the first virtual reality format or the second virtual reality format may include a video container that may include an MP4, WebM, VP8, etc. As yet another example, the first virtual reality format or the second virtual reality format may be used to playback virtual reality content on a device selected from the following: Project StarVR, Oculus Rift, AirVR, Avegant Glyph, Cmoar, Durovis Dive, Dior Eyes VR, Emax X1, Fove, Google Cardboard, Homido, HTC Vive, ImmersiON-VRelia BlueSky, Impression Pi, MindMaze NeuroGoggles, Pinch VR, Razer OSVR, Samsung Gear VR, Sony Project Morpheus, Viewbox, Visus, VR Union Claire, Vrvana Totem, Xingear XG, Zeiss One VR, etc.

In some embodiments, more than two virtual reality content having different virtual reality formats may be created. In some embodiments, the first virtual reality content and the second virtual reality content may be stored within virtual reality data store 120 and/or the network attached virtual reality storage service 135.

At block 325 the first VR content and the second VR content are provided for download, for example, via the VR content delivery network 130. In some embodiments, the first VR content and the second VR content may be provided in response to a user selecting one or more links or icons on a webpage or in an app. In some embodiments, the first VR content or the second VR content may be delivered to the user's device based on the type of device being used. For example, if the user is using a device compatible with the first format, then the first VR content may delivered to the user's device in response to the user selecting the appropriate link or icon representing the VR content. In some embodiments, the first VR content and the second VR content may be pushed to one or more VR devices based on the compatibility of the first VR content and the second VR content with the one or more VR devices.

In some embodiments, the first VR content and the second VR content may be provided via a single link or icon that represents a specific VR content. A user interface (e.g., via a webpage or an application), for example, may present a single link and/or icon to users. When the single link and/or icon is selected a request for the specific VR content may be sent to the VR content delivery network 130. The request may include information that can be used to determine the format of the VR content to be delivered to the user. For example, the information may specify the type of device requesting the specific VR content, the preferred VR format, etc. In response, the VR content delivery network 130 may deliver the first VR content or the second VR contend depending on the information provided in the request. Thus, a single link or icon may be presented to users, yet different formats of the VR content may be provided in response to a user selecting the single link or icon.

Figure 4:
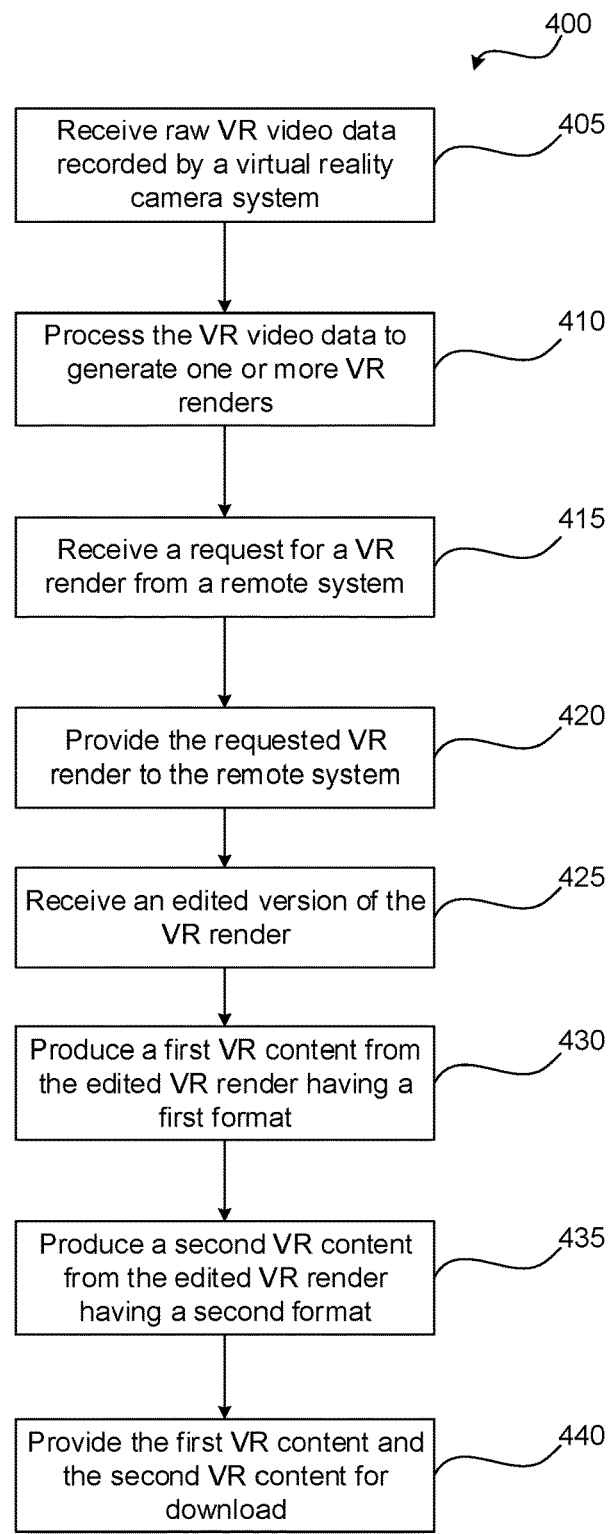
FIG. 4 is another flowchart of an example process for producing virtual reality content using a cloud-based virtual reality processing system.

FIG. 4 is a flowchart of an example process 400 for producing virtual reality content using a cloud-based virtual reality processing system according to some embodiments. One or more steps of the process 400 may be implemented, in some embodiments, by one or more components of the cloud-based virtual reality content processing system 100 of FIG. 1. Although illustrated as discrete blocks, various blocks may be divided into additional blocks, combined into fewer blocks, or eliminated, depending on the desired implementation.

Process 400 begins at block 405. At block 405, raw virtual reality video data is received from a virtual reality camera system. In some embodiments, block 405 may input raw virtual reality video data from a remote system to a cloud based processing service. In some embodiments, block 405 may be substantially similar to block 305 of process 300 in FIG. 3.

At block 410 the raw virtual reality video data is processed to produce one or more virtual reality renders. Block 410 is substantially similar to block 310 of process 300 in FIG. 3.

At block 415 a request may be received from a remote system for a virtual reality render(s). The request may include user identification (e.g., a user name), a password, and/or other credentials allowing the user to access the render. In some embodiments, the user may request the render by file name, by project name, by render name, by segment name, by recording name, by video frame number, by time, by location, by a time period, by a video frame range, etc.

At block 420 the virtual reality render may be provided to the remote system. In some embodiments, the virtual reality render may be provided to the remote system by providing a link to the remote system that can be selected to retrieve the virtual reality render from the cloud-based server (e.g., virtual reality data store 120). In some embodiments, the virtual reality render may be pushed to the remote system. Various other content delivery mechanisms may be used to deliver the virtual reality render.

After editing the virtual reality render the remote system may upload or submit an edited virtual reality render to the cloud based processing system. At block 425 the edited virtual reality render may be received at the cloud based processing server. The edited virtual reality render may be stored in a cloud based storage location (e.g., virtual reality data store 120) as another version of the render, recording, and/or segment. In some embodiments, a plurality of versions of a single virtual reality render may be stored within the cloud based storage location.

At block 430 first VR content may be produced from the one or more renders including the edited virtual reality render. The first VR content has a first VR format. The first VR content may be produced from the one or more renders produced at block 410 and the edited virtual reality render received at block 425. In some embodiments, the VR processing server 315 may produce the first VR content.

At block 435 second VR content may be produced from the one or more renders including the edited virtual reality render. The second VR content has a second VR format that is different than the first VR format. The second VR content may be produced from the one or more renders produced at block 410 and the edited virtual reality render received at block 425. In some embodiments, the virtual reality processing server 115 may produce the second VR content. The first VR content and the second VR content may include the same number, combination, order, organization, etc. of virtual reality renders and/or edited virtual reality renders. The first VR content and the second VR content may provide views of the same portions of the scene recorded in the raw virtual reality video data.

In some embodiments, a user may input data that indicates the segments of the VR renders that should be used to create the first VR content and the second VR content. In some embodiments, the first VR content and the second VR content are produced from the same segments of the same renders and only differ based on the format of the VR content.

In some embodiments, the first VR content and the second VR content may include audio data.

The first virtual reality format may differ from the second virtual reality format based on the geometry, the video container, the type of playback device, etc. For example, the geometry of a first virtual reality format or the second virtual reality format may include a conical, planer, spherical, cubic, three-dimensional, panoramic, etc. geometry. As another example, the first virtual reality format or the second virtual reality format may include a video container that may include an MP4, WebM, VP8, etc. As yet another example, the first virtual reality format or the second virtual reality format may be used to playback virtual reality content on a device selected from the following: Project StarVR, Oculus Rift, AirVR, Avegant Glyph, Cmoar, Durovis Dive, Dior Eyes VR, Emax X1, Fove, Google Cardboard, Homido, HTC Vive, ImmersiON-VRelia BlueSky, Impression Pi, MindMaze NeuroGoggles, Pinch VR, Razer OSVR, Samsung Gear VR, Sony Project Morpheus, Viewbox, Visus, VR Union Claire, Vrvana Totem, Xingear XG, Zeiss One VR, etc.

In some embodiments, more than two virtual reality content having different virtual reality formats may be created. In some embodiments, the first virtual reality content and the second virtual reality content may be stored within virtual reality data store 120 and/or the network attached virtual reality storage service 135.

At block 440 the first VR content and the second VR content are provided for download, for example, via the VR content delivery network 130. In some embodiments, the first VR content and the second VR content may be provided in response to a user selecting a link or an icon on a webpage or in an app. The first VR content or the second VR content may be delivered to the user's device based on the type of device being used. For example, if the user is using a device compatible with the first format, then the first VR content may delivered to the user's device in response to the user selecting the appropriate link or icon representing the VR content. In some embodiments, the first VR content and the second VR content may be pushed to one or more VR devices based on the compatibility of the first VR content and the second VR content with the one or more VR devices.

Figure 5:
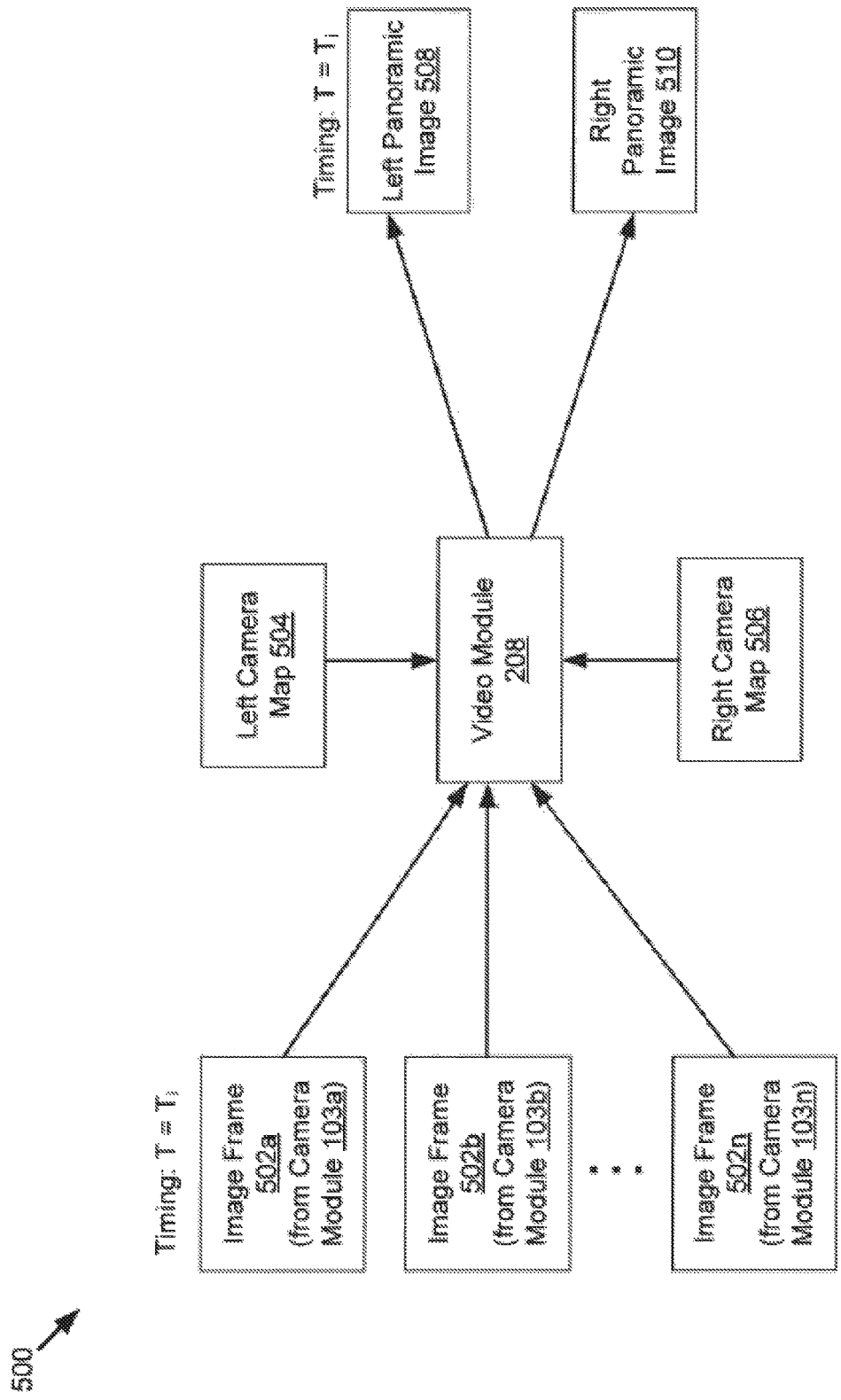
FIG. 5 illustrates an example process of generating a left panoramic image and a right panoramic image from multiple image frames that are captured by multiple cameras at a particular time.

FIG. 5 illustrates an example process 500 of generating a left panoramic image and a right panoramic image from multiple image frames that are captured by multiple cameras of the virtual reality camera. At a particular time $T=T_i$ (i=0, 1, 2, ... ), a first camera module of the virtual reality camera system 109 captures an image frame 502*a*, a second camera module of the virtual reality camera system 109 captures an image frame 502*b*, and a third camera module of the virtual reality camera system 109 captures an image frame 502*n*. Video module 208 (or virtual reality processing services 115) may receive image frames 502*a*, 502*b*, and 502*n*. In some embodiments, video module 208 aggregates image frames 502*a*, 502*b*, and 502*n* to generate a left panoramic image 508 based on a left camera map 504 and a right panoramic image 510 based on a right camera map 506. Left panoramic image 508 and right panoramic image 510 are associated with the particular time $T=T_i$.

FIG. 6A is a graphic representation 600 illustrating an example panoramic image, arranged in accordance with at least some embodiments described herein. The panoramic image has a first axis "yaw" which represents rotation in a horizontal plane and a second axis "pitch" which represents up and down rotation in a vertical direction. The panoramic image covers an entire 360-degree sphere of a scene panorama. A pixel at a position [yaw, pitch] in the panoramic image represents a point in a panorama viewed with a head rotation having a "yaw" value and a "pitch" value. Thus, the panoramic image includes a blended view from various head rotations rather than a single view of the scene from a single head position.

FIG. 6B is a graphic representation 650 illustrating an example camera map, arranged in accordance with at least some embodiments described herein. The example camera map matches first pixels in camera sections 652*a* and 652*b* of a panoramic image to a first matching camera module of the virtual reality camera system 109, second pixels in a camera section 654 to a second matching camera module of the virtual reality camera system 109, and third pixels in camera sections 656*a* and 656*b* to a third matching camera module of the virtual reality camera system 109. For the first pixels of the panoramic image within camera sections 652*a* and 652*b*, values for the first pixels may be configured to be corresponding pixel values in a first image frame captured by first matching camera module of the virtual reality camera system 109. Similarly, for the second pixels of the panoramic image within camera section 654, values for the second pixels may be configured to be corresponding pixel values in a second image frame captured by second matching camera module of the virtual reality camera system 109. For the third pixels of the panoramic image within camera sections 656*a* and 656*b*, values for the third pixels may be configured to be corresponding pixel values in a third image frame captured by third matching camera module of the virtual reality camera system 109. In this example, the panoramic image is stitched using part of the first image frame from first matching camera module of the virtual reality camera system 109, part of the second image frame from second matching camera module of the virtual reality camera system 109, part of the third image frame from third matching camera module of the virtual reality camera system 109, and part of other image frames from other matching cameras of the virtual reality camera system 109.

Figure 7A:
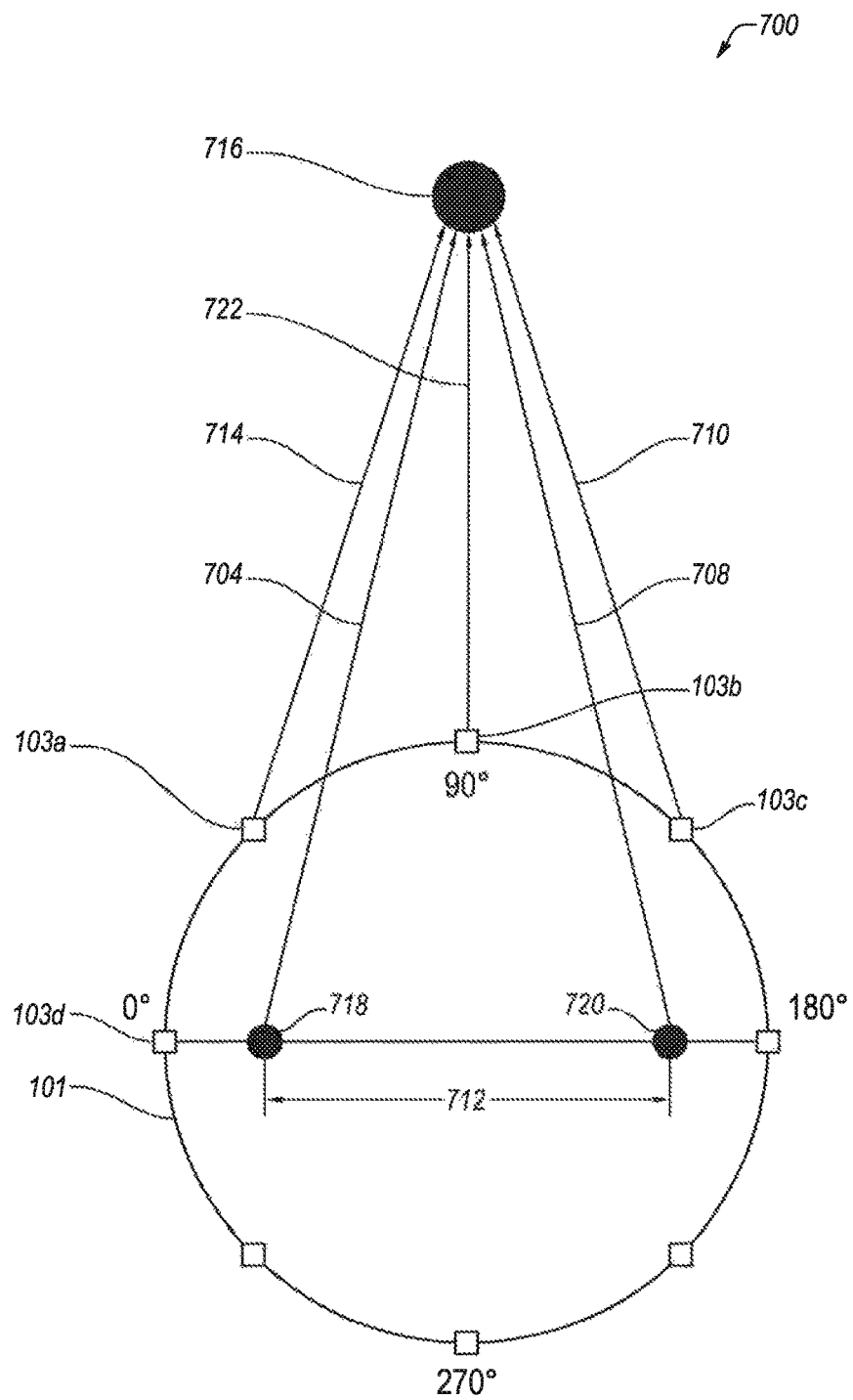
FIGS. 7A and 7B are graphic representations that illustrate example processes of selecting a first camera module for a pixel in a left panoramic image to construct a left camera map and selecting a second camera module for the pixel in a right panoramic image to construct a right camera map.
Figure 7B:
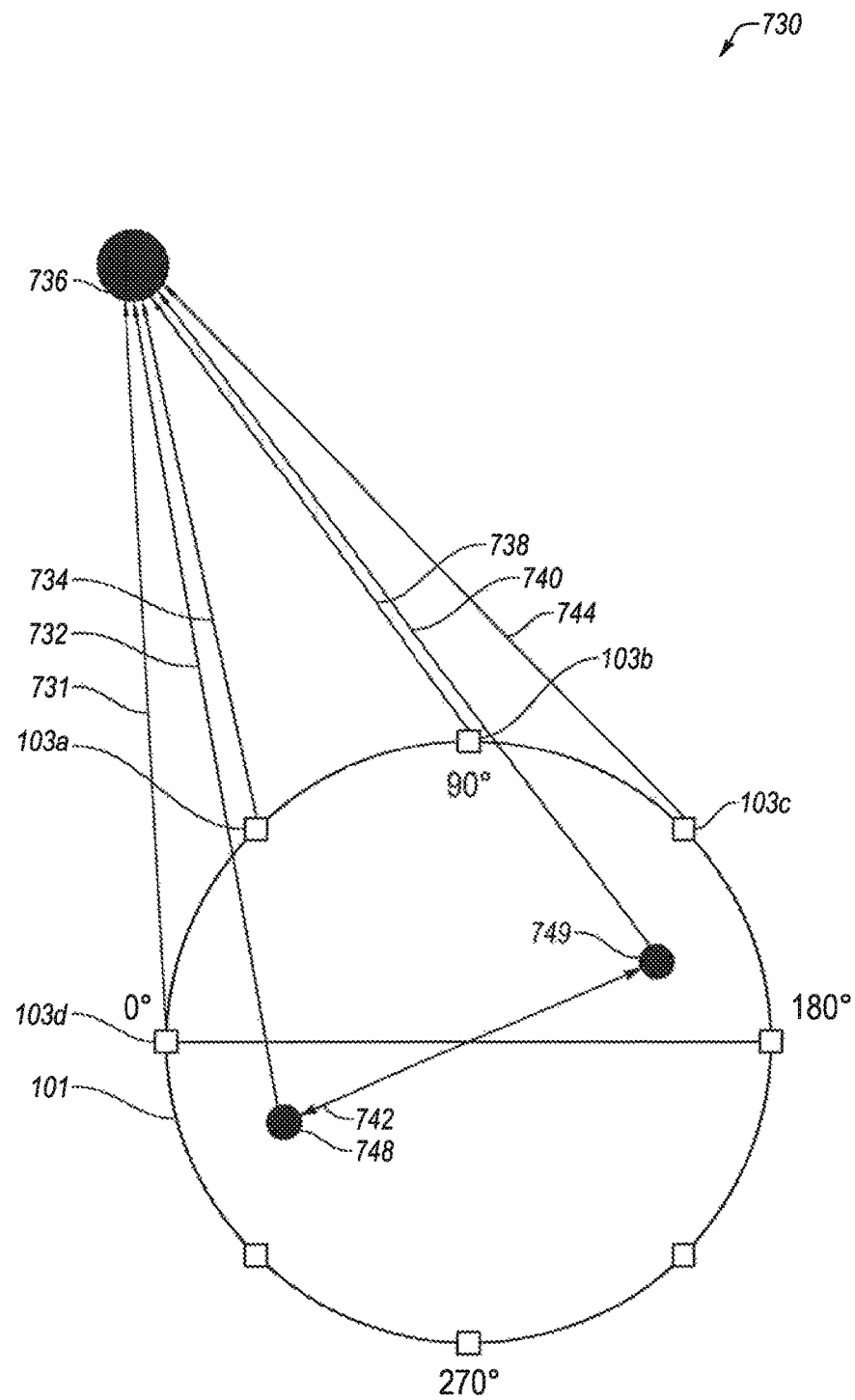

FIGS. 7A and 7B are graphic representations 700 and 730 that illustrate example processes of selecting matching cameras of the virtual reality camera system 109 for a pixel in a left and a right panoramic images, arranged in accordance with at least some embodiments described herein. Referring to FIG. 7A, virtual reality camera system 109 includes a plurality of camera modules that may, for example, be mounted on a spherical housing. Assume that a point 716 corresponds to a head rotation position with yaw=90° and pitch=0°. An interocular distance 712 is illustrated between a left eye position 718 and a right eye position 720. Since pitch=0°, interocular distance 712 is at its maximum value. Left eye position 718 and right eye position 720 may be determined by: (1) drawing a first line from point 716 to a center of virtual reality camera system 109; (2) determining an interocular distance based on a current pitch value; (3) drawing a second line that is perpendicular to the first line and also parallel to a plane with yaw=[0°, 360°] and pitch=0°, where the second line has a length equal to the determined interocular distance and is centered at the center of virtual reality camera system 109; and (4) configuring a left end point of the second line as left eye position 718 and a right end point of the second line as right eye position 720.

A left viewing direction 704 from left eye position 718 to point 716 and a right viewing direction 708 from right eye position 720 to point 716 are illustrated in FIG. 7A. Each of the camera modules of the virtual reality camera system 109 have viewing directions 714, 722, 710 to point 716, respectively.

Since a viewing direction 714 of a first camera module of the virtual reality camera system 109 is more parallel to a left viewing direction 704 compared to other viewing directions 722 and 710 (e.g., an angle between viewing direction 714 and left viewing direction 704 is smaller than angles between left viewing direction 704 and other viewing directions 722 and 710), the first camera module may be selected as a matching camera module that has a better view for point 716 than other cameras in a left camera map. Since viewing direction 710 of a third camera module of the virtual reality camera is more parallel to right viewing direction 708 compared to other viewing directions 722 and 714, a third camera module of the virtual reality camera system 109 may be selected as a matching camera module that has a better view for point 716 than other cameras in a right camera map.

Referring to FIG. 7B, assume that a point 736 in a panorama corresponds to a head rotation position with yaw=80° and pitch=0°. An interocular distance 742 is illustrated between a left eye position 748 and a right eye position 749. A left viewing direction 734 from left eye position 748 to point 736 and a right viewing direction 740 from right eye position 749 to point 736 are illustrated in FIG. 7B. The first camera, the second camera, the third camera, and the fourth camera of the virtual reality camera system 109 have viewing directions 732, 738, 744, 731 to point 736, respectively. Since viewing direction 732 is more parallel to left viewing direction 734 compared to other viewing directions 738, 744, 731, the first camera of the virtual reality camera system 109 is selected as a matching camera module that has a better view for point 736 in a left camera map. Since viewing direction 738 of the second camera of the virtual reality camera system 109 is more parallel to right viewing direction 740 compared to other viewing directions 731, 734, 744, the second camera module of the virtual reality camera system 109 is selected as a matching camera module that has a better view for point 736 in a right camera map.

In some embodiments, operations to determine a matching camera module for point 736 in a left panoramic image for left eye viewing may be summarized as following: (1) determining a set of cameras that have point 736 in their respective fields of view; (2) determining left viewing direction 734 from left eye position 748 to point 736; (3) determining a set of viewing directions to point 736 for the set of cameras; (4) selecting viewing direction 732 from the set of viewing directions, where viewing direction 732 forms a smallest angle with left viewing direction 734 compared to angles formed between left viewing direction 734 and other viewing directions in the set (in other words, viewing direction 732 being more parallel to left viewing direction 734 than the other viewing directions); and (5) configuring a matching camera module for point 736 as the first camera module of the virtual reality camera system 109 that has viewing direction 732. Some other cost functions for determining the matching camera module for point 736 in the left panoramic image are possible as long as the cost functions may define some notion of best approximation to the view from left eye position 748.

Similarly, operations to determine a matching camera module for point 736 in a right panoramic image for right eye viewing may be summarized as following: (1) determining the set of cameras that have point 736 in their respective fields of view; (2) determining right viewing direction 740 from right eye position 749 to point 736; (3) determining the set of viewing directions to point 736 for the set of cameras; (4) selecting viewing direction 738 from the set of viewing directions, where viewing direction 738 forms a smallest angle with right viewing direction 740 compared to angles formed between right viewing direction 740 and other viewing directions in the set; and (5) configuring a matching camera module for point 736 as the second camera module of the virtual reality camera system 109 that has viewing direction 738. Some other cost functions for determining the matching camera module for point 736 in the right panoramic image are possible as long as the cost functions may define some notion of best approximation to the view from right eye position 749.

Figure 8:
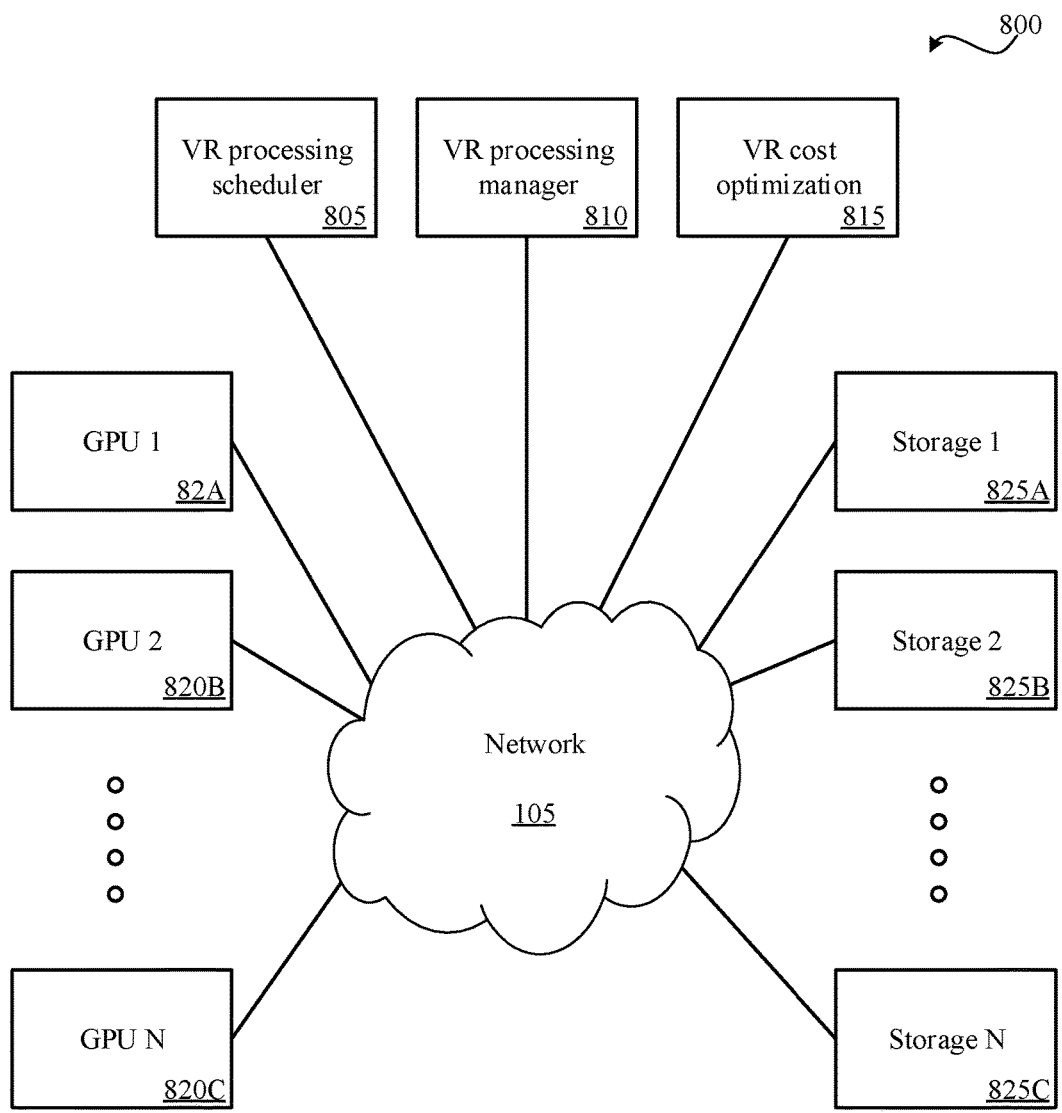
FIG. 8 is a block diagram of a distributed virtual reality processing server according to some embodiments.

FIG. 8 is a block diagram of a distributed virtual reality processing server 800 according to some embodiments. The distributed virtual reality processing server 800 may represent on or more components of virtual reality content processing system 100 in FIG. 1 and/or virtual reality data store 120 in FIG. 1.

The virtual reality processing server 800 may include a virtual reality processing scheduler 805, a virtual reality processing manager module 810, and/or a virtual reality processing cost optimization module 815. In some embodiments, the virtual reality processing scheduler 805, the virtual reality processing manager module 810, and/or the virtual reality processing cost optimization module 815 may be modules that re executed or performed on a single server. In some embodiments, the virtual reality processing scheduler 805, the virtual reality processing manager module 810, and/or the virtual reality processing cost optimization module 815 may be modules that may be executed or performed on one or more of a plurality of servers. In some embodiments, the virtual reality processing scheduler 805, the virtual reality processing manager module 810, and the virtual reality processing cost optimization module 815 may be executed on a unique and separate server.

In some embodiments, the virtual reality processing scheduler 805 may schedule the processing of one or more virtual reality render projects across a plurality of distributed virtual reality processing resources. In some embodiments, the virtual reality processing scheduler 805 may create a virtual reality processing map that specifies the virtual reality processing jobs or tasks to be completed by one or more virtual reality processing resource (e.g., graphical processing unit). In some embodiments, the virtual reality processing scheduler 805 may parse a virtual reality render project into a plurality of virtual reality render jobs that can be executed on one or more virtual reality processing resources.

In some embodiments, the virtual reality processing scheduler 805 may create the virtual reality map based on the availability of virtual reality resources, the priority of the virtual reality project, and/or the cost of the virtual reality resources.

In some embodiments, the virtual reality processing virtual reality processing manager module 810 may query a plurality of virtual reality resources to determine the availability of the plurality of virtual reality resources. In some embodiments, the virtual reality processing virtual reality processing manager module 810 may determine the availability of a virtual reality processing resource based on previously scheduled, scheduled, and/or executing virtual reality processing maps. In some embodiments, the virtual reality processing virtual reality processing manager module 810 may manage the processing of a virtual reality map across a plurality of virtual reality resources. In some embodiments, the virtual reality processing virtual reality processing manager module 810 may redistribute the processing of one or more virtual reality render jobs in the event of a failure or slowdown at one or more of the virtual reality processing resources.

In some embodiments, the virtual reality processing virtual reality processing cost optimization module 815 may determine a cost associated with using a given virtual reality processing resource. Virtual reality processing resources may be financially more costly depending on the time of day the virtual reality processing resource is used. In some embodiments, the cost of a virtual reality processing resource may depend on the current demand on the virtual reality processing resource. In some embodiments, the cost of a virtual reality process resource may change dynamically.

In some embodiments, the cost associated with a virtual reality processing resource may be a time based cost. For instance, processing a virtual reality render job at a given virtual reality processing resources may be more time consuming based on the time it takes to transmit data to the remote location of the virtual reality processing resource, based on the processing power of the virtual reality processing resource, etc.

In some embodiments, the virtual reality processing scheduler 805, the virtual reality processing manager module 810, and/or the virtual reality processing cost optimization module 815 may be in communication via the network 115. In some embodiments, the virtual reality processing scheduler 805, the virtual reality processing manager module 810, and/or the virtual reality processing cost optimization module 815 may be in direct communication.

In some embodiments, a virtual reality resource may include a virtual reality processing node 820 and/or a virtual reality cloud storage location 825.

In some embodiments, the virtual reality processing server 800 may include a plurality of virtual reality processing nodes 820A, 820B, and 820N (individually or collectively referred to as 820) such as, for example, a graphical processing unit. While three are shown, any number may be used. In some embodiments, a virtual reality processing node 820 may be a graphical processing unit (GPU). In some embodiments, a virtual reality processing node 820 may be a server or node on a server. In some embodiments, a virtual reality processing node 820 may be a cloud-based server. In some embodiments, a virtual reality processing node 820 may be a third-party server that is accessed across the cloud. In some embodiments, a virtual reality processing node 820 may be a server virtual server. In some embodiments, a virtual reality processing node 820 may be a server of a plurality of servers distributed across the network 115. In some embodiments, a virtual reality processing node 820 may execute one or more processes or portions of one or more processes described as part of this document or incorporated into this document in order to create a virtual reality render or a virtual reality video.

In some embodiments, the virtual reality processing server 800 may include a plurality of virtual reality cloud storage locations 8205, 825B, and 825N (individually or collectively referred to as 825) such as, for example, a graphical processing unit. While three are shown, any number may be used. In some embodiments, a virtual reality cloud storage location 825 may be a graphical processing unit (GPU). In some embodiments, a virtual reality cloud storage location 825 may be part of or may comprise the virtual reality data store 120. In some embodiments, virtual reality cloud storage location 825 may be a server or node on a server. In some embodiments, a virtual reality cloud storage location 825 may be a cloud-based server. In some embodiments, a virtual reality cloud storage location 825 may be a third-party server that is accessed across the cloud. In some embodiments, a virtual reality cloud storage location 825 may be a server virtual server. In some embodiments, a virtual reality cloud storage location 825 may be a server of a plurality of servers distributed across the network 115. In some embodiments, a virtual reality cloud storage location 825 may be used to store all or parts of the raw virtual reality video data, virtual reality video data, the virtual reality render, and/or the virtual reality data prior to or during processing of the virtual reality render.

In some embodiments, network 105 such as, for example, the Internet, may communicatively couple the virtual reality processing scheduler 805, the virtual reality processing manager module 810, the virtual reality processing cost optimization module 815, the virtual reality processing node 820, and/or the virtual reality cloud storage locations 825.

In some embodiments, the virtual reality processing server 800 may schedule and/or manage the processing, stitching, rendering, etc. of raw virtual reality video data into one or more virtual reality videos.

Figure 9:
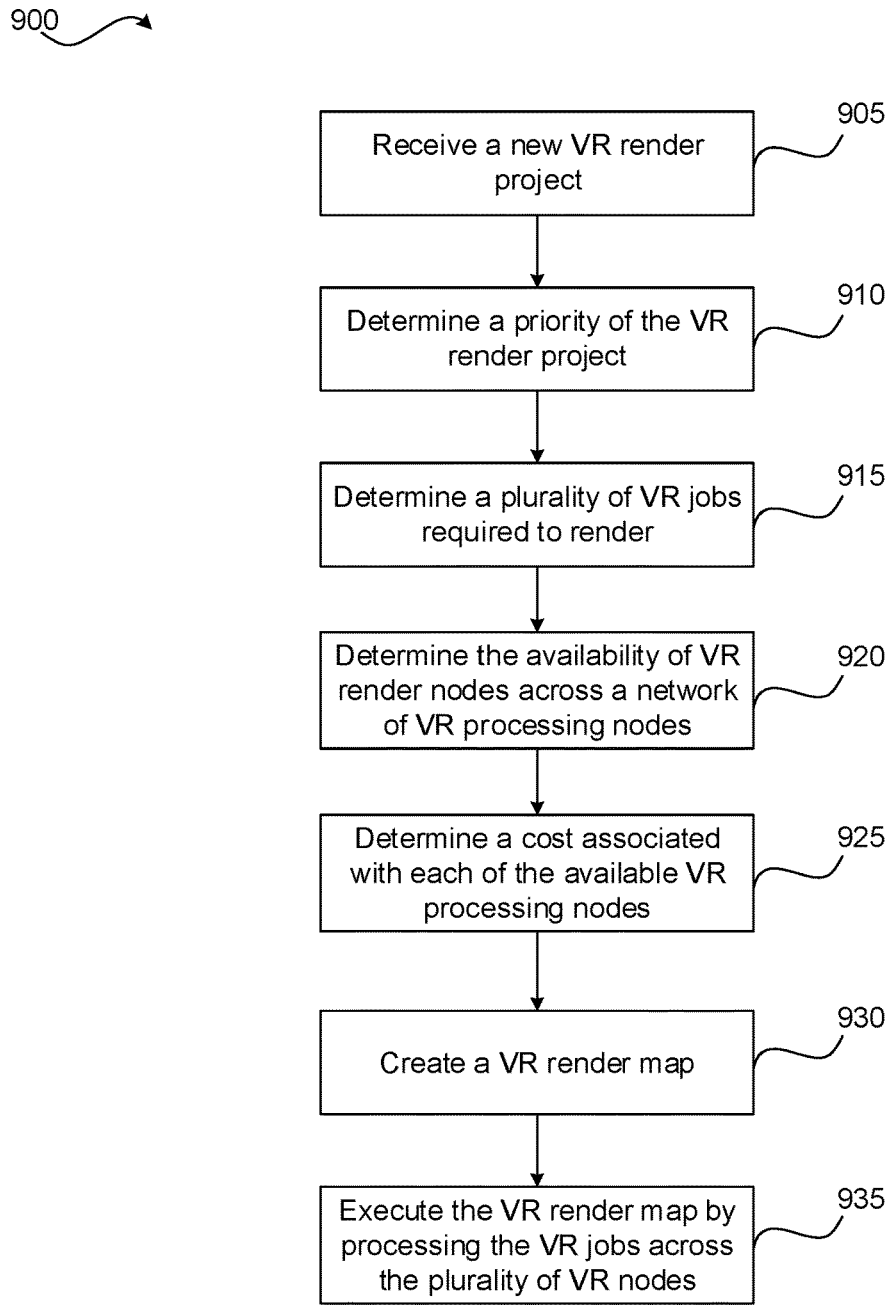
FIG. 9 is a flowchart of an example process for scheduling resources in a cloud-based virtual reality processing system according to some embodiments.

FIG. 9 is a flowchart of an example process 900 for scheduling resources in a cloud-based virtual reality processing system according to some embodiments. One or more steps of the process 900 may be implemented, in some embodiments, by one or more components of the distributed virtual reality processing server 800 of FIG. 8. Although illustrated as discrete blocks, various blocks may be divided into additional blocks, combined into fewer blocks, or eliminated, depending on the desired implementation.

Process 900 may begin at block 905. At block 905, a virtual reality render project may be received. The virtual reality render project, for example, may be received from a user interface that is coupled with the virtual reality processing server 800, virtual reality content processing system 100, from a user through the network 105, or in any other way. In some embodiments, the virtual reality render project may include a message that includes data or metadata that specifies characteristics of the virtual reality render project.

In some embodiments, the characteristics of the virtual reality render project may include information specifying a virtual reality segment, a storage location of a virtual reality segment, a storage location of raw virtual reality video data, a virtual reality camera used to record raw virtual reality video data, the geometry of the virtual reality camera used to record the raw virtual reality video data, the format of the virtual reality render; the geometry of the virtual reality render, a time frame of the raw virtual reality video data, a project identifier, a priority of the virtual reality render, and a priority of the virtual reality render.

At block 910 a priority of a virtual reality render may be identified. The priority may specify the urgency or importance of a virtual reality render project. In some embodiments, virtual reality render projects having a higher priority may be processed before virtual reality render projects with a lower priority. In some embodiments, virtual reality render projects may be queued based on the priority. In some embodiments, priority may be identified from a lookup table providing the priority of various virtual reality render projects. In some embodiments, the priority may be received as part of receiving the virtual reality render project.

At block 915 the virtual reality render project may be broken down into a plurality of virtual reality render jobs that can be executed independently using the raw virtual reality video data.

At block 920 the availability of virtual reality processing nodes across a network of VR render nodes can be determined. For example, the virtual reality virtual reality processing manager module 810, may determine which of a plurality of virtual reality processing nodes 820 are available for the virtual reality render project. For example, a virtual reality processing node can be considered available if it is not currently processing a portion of a virtual reality render. As another example, a virtual reality processing node can be considered available if it is not scheduled for processing a virtual reality render for a predetermined period of time in the future. The predetermined period of time may vary depending on the processing speed of the virtual reality processing node and/or the size of the virtual reality render job being performed at the virtual reality processing node. As another example, a virtual reality processing node can be considered available if the virtual reality processing node is not being used by another process.

At block 925 a cost associated with the available virtual reality processing nodes can be determined. The cost, for example, can be determined by the virtual reality processing cost optimization module 815.

At block 930 a virtual reality render map may be created. In some embodiments, the virtual reality render map may be created by the virtual reality processing scheduler 805. The virtual reality render map may associate each of the plurality of virtual reality render jobs with a virtual reality processing node 820. The virtual reality render map may also specify the storage location of one or more portions of the virtual reality raw video data and/or virtual reality video data processed by the virtual reality processing nodes. In some embodiments, the virtual reality render map may be communicated to the plurality of virtual reality processing nodes 820 identified in the virtual reality processing map. In some embodiments, the virtual reality map may indicate type of operation to be executed by a given virtual reality processing node, the location of the virtual reality video data to be processed is stored, the location where the processed virtual reality data will be stored, and/or other parameters.

At block 935 the virtual reality render map may be executed by processing the virtual reality processing jobs across a plurality of the virtual reality processing nodes as specified in the virtual reality render map. In some embodiments, the execution of the virtual reality render map may coordinated by the virtual reality processing manager module 810.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A method comprising:
    receiving a request for a render project that includes information specifying three-dimensional video data to be used to create a render, the information including a segment, a storage location of the segment, a storage location of initial video data, two or more cameras used to record the initial video data, a geometry of each of the two or more cameras used to record the initial video data, a format of the render, a geometry of the render, a time frame of the initial video data, a project identifier, and a priority of the render;
    determining a plurality of jobs required to create the render from the three-dimensional video data;
    determining an availability of a plurality of nodes across a network;
    creating a render map that specifies a processing sequence of the plurality of jobs across the plurality of nodes to create the render, the render map being created based on at least the availability of the plurality of nodes; and
    processing the plurality of jobs at the plurality of nodes to create three-dimensional content.

2. The method according to claim 1, wherein at least some of the plurality of the jobs are processed in parallel at a same time.

3. The method according to claim 1, wherein the plurality of nodes are distributed across the Internet.

4. The method according to claim 1, wherein the plurality of nodes include a plurality of cloud-based storage locations where portions of the three-dimensional video data are stored and/or a plurality of graphics processing units.

5. The method according to claim 1, wherein the three-dimensional content includes virtual reality content, augmented reality content, mixed reality content, or XR content.

6. The method according to claim 1, wherein the request further includes metadata and the information further specifies one or more characteristics of the render.

7. The method according to claim 1, further comprising determining a priority of the render project in relation to one or more other render projects, and wherein the creating the render map is based on the priority of the render project.

8. The method according to claim 1, further comprising determining a cost associated with one or more of the plurality of nodes, and wherein creating the render map is based on the cost.

9. The method according to claim 1, wherein the map specifies which of the plurality of nodes that will execute each of the plurality of jobs.

10. A cloud-based virtual reality content processing system comprising:
a network;
a plurality of processing servers communicatively coupled with the network; and
a processing schedule server communicatively coupled with network,
wherein the processing schedule server is configured to:
receive a request for a render project to be created from three-dimensional video data, the request including a segment, a storage location of the segment, a storage location of initial video data, two or more cameras used to record the initial video data, a geometry of each of the two or more cameras used to record the initial video data, a format of the render, a geometry of the render, a time frame of the initial video data, a project identifier, and a priority of the render;
determine a plurality of processing jobs required to create the render from the three-dimensional video data;
determine an availability of the plurality of the processing servers;
create a render map that specifies a processing sequence of the plurality of processing jobs across the plurality of the processing servers to create the render, the render map being created based on at least the availability of a plurality of nodes; and
instruct the plurality of the processing servers to execute the render map at the plurality of the processing servers.

11. The cloud-based content processing system according to claim 10, wherein the processing schedule server is further configured to store the render after it is created by the plurality of the processing servers.

12. The cloud-based content processing system according to claim 10, wherein the plurality of processing servers are distributed across the Internet.

13. The cloud-based content processing system according to claim 10, wherein the processing schedule server is further configured to determine a priority of the render project in relation to one or more other render projects, and wherein the creating the render map is based on the priority of the render project.

14. The cloud-based content processing system according to claim 10, wherein the processing schedule server is further configured to determine a cost associated with one or more of the plurality of nodes, and wherein the creating the render map is based on the cost.

15. The cloud-based content processing system according to claim 10, further comprising a plurality of cloud-based storage locations where portions of the three-dimensional video data are stored.

16. The cloud-based content processing system according to claim 10, wherein the processing schedule server is further configured to process the plurality of jobs at the plurality of nodes to create three-dimensional content and the three-dimensional content includes virtual reality content, augmented reality content, mixed reality content, or XR content.

17. The cloud-based content processing system according to claim 10, wherein the request includes metadata specifying one or more characteristics of the render.

18. A non-transitory computer storage medium encoded with a computer program, the computer program comprising instructions that, when executed by one or more processors, cause the one or more processors to perform operations comprising:
receiving a request for a render project that includes information specifying three-dimensional video data to be used to create a render, the information including a segment, a storage location of the segment, a storage location of initial video data, two or more cameras used to record the initial video data, a geometry of each of the two or more cameras used to record the initial video data, a format of the render, a geometry of the render, a time frame of the initial video data, a project identifier, and a priority of the render;
determining a plurality of jobs required to create the render from the three-dimensional video data;
determining an availability of a plurality of nodes across a network;
creating a render map that specifies a processing sequence of the plurality of jobs across the plurality of nodes to create the render, the render map being created based on at least the availability of the plurality of nodes; and
processing the plurality of jobs at the plurality of nodes to create three-dimensional content.

19. The computer storage medium of claim 18, wherein the plurality of nodes include a plurality of cloud-based storage locations where portions of the three-dimensional video data are stored and/or a plurality of graphics processing units.

20. The computer storage medium of claim 18, wherein the three-dimensional content includes virtual reality content, augmented reality content, mixed reality content, or XR content.

* * * * *